US010645128B2

(12) United States Patent
Liu et al.

(10) Patent No.: US 10,645,128 B2
(45) Date of Patent: May 5, 2020

(54) MEDIA SESSION PROCESSING METHOD, RELATED DEVICE, AND COMMUNICATIONS SYSTEM

(71) Applicant: HUAWEI TECHNOLOGIES CO., LTD., Shenzhen (CN)

(72) Inventors: Yan Liu, Shenzhen (CN); Weiwei Yang, Xi'an (CN)

(73) Assignee: HUAWEI TECHNOLOGIES CO., LTD., Shenzhen (CN)

(*) Notice: Subject to any disclaimer, the term of this patent is extended or adjusted under 35 U.S.C. 154(b) by 118 days.

(21) Appl. No.: 15/851,203

(22) Filed: Dec. 21, 2017

(65) Prior Publication Data
US 2018/0139250 A1 May 17, 2018

Related U.S. Application Data

(63) Continuation of application No. PCT/CN2016/079887, filed on Apr. 21, 2016.

(30) Foreign Application Priority Data

Jun. 29, 2015 (CN) .......................... 2015 1 0368853

(51) Int. Cl.
H04L 29/06 (2006.01)
H04L 12/801 (2013.01)
H04L 12/833 (2013.01)

(52) U.S. Cl.
CPC ............ H04L 65/403 (2013.01); H04L 29/06 (2013.01); H04L 47/11 (2013.01); H04L 47/15 (2013.01);
(Continued)

(58) Field of Classification Search
CPC ......... H04L 29/06; H04L 47/11; H04L 47/15; H04L 47/2458; H04L 65/1069;
(Continued)

(56) References Cited

U.S. PATENT DOCUMENTS

2007/0274344 A1* 11/2007 Yang ................. H04L 29/06027
370/486
2009/0172763 A1* 7/2009 Liu .................... H04L 29/06027
725/114
(Continued)

FOREIGN PATENT DOCUMENTS

CN 1728677 A 2/2006
CN 1984060 A 6/2007
(Continued)

OTHER PUBLICATIONS

XP015100529 M. Westerlund et al.,"Using Simulcast in RTP Sessions draft-westerlund-avtcore-rtp-simulcast-04", Network Working Group Internet-Draft,dated Jul. 4, 2014,total 22 pages.

Primary Examiner — Joe Chacko
(74) Attorney, Agent, or Firm — Kilpatrick Townsend & Stockton LLP

(57) ABSTRACT

Embodiments of the present invention disclose a media session processing method, a device, and a system. The method may include: determining, by a first media device, global priorities of media streams corresponding to N media sources, where the N media sources are N media sources that can be provided by the first media device in a media session in which a second media device participates, and one of the N media sources corresponds to at least two media streams used to be simulcast in the session; and when a transmission path between the first media device and the second media device is congested, performing, based on the determined global priorities of the media streams corresponding to the N media sources, congestion control on the media streams corresponding to the N media sources that are sent by the first media device to the second media device.

18 Claims, 7 Drawing Sheets

(52) U.S. Cl.
CPC ...... *H04L 47/2458* (2013.01); *H04L 65/1069* (2013.01); *H04L 65/1083* (2013.01); *H04L 65/4015* (2013.01); *H04L 65/4076* (2013.01); *H04L 65/608* (2013.01); *H04L 65/80* (2013.01)

(58) Field of Classification Search
CPC ............. H04L 65/1083; H04L 65/4015; H04L 65/403; H04L 65/4076; H04L 65/608; H04L 65/80
See application file for complete search history.

(56) References Cited

U.S. PATENT DOCUMENTS

| | | | |
|---|---|---|---|
| 2010/0223044 A1* | 9/2010 | Gisby | H04M 3/56 704/3 |
| 2011/0119387 A1* | 5/2011 | Keller | H04L 65/605 709/227 |
| 2012/0087380 A1* | 4/2012 | Tang | H04L 12/56 370/474 |
| 2013/0155889 A1* | 6/2013 | Brownworth | H04W 36/0083 370/252 |
| 2015/0181164 A1* | 6/2015 | Yang | H04M 3/567 348/14.08 |
| 2016/0036704 A1 | 2/2016 | Xiao et al. | |
| 2016/0277774 A1* | 9/2016 | Yamagishi | H04N 21/235 |
| 2016/0316174 A1* | 10/2016 | Whynot | H04L 49/35 |

FOREIGN PATENT DOCUMENTS

| | | | |
|---|---|---|---|
| CN | 1997180 A | 7/2007 | |
| CN | 104113766 A | 10/2014 | |
| EP | 2966816 A1 | 1/2016 | |
| KR | 100717846 B1 | 5/2007 | |
| WO | WO 2014169599 A1 * | 10/2013 | ......... H04L 47/2416 |
| WO | 2015072898 A1 | 5/2015 | |

* cited by examiner

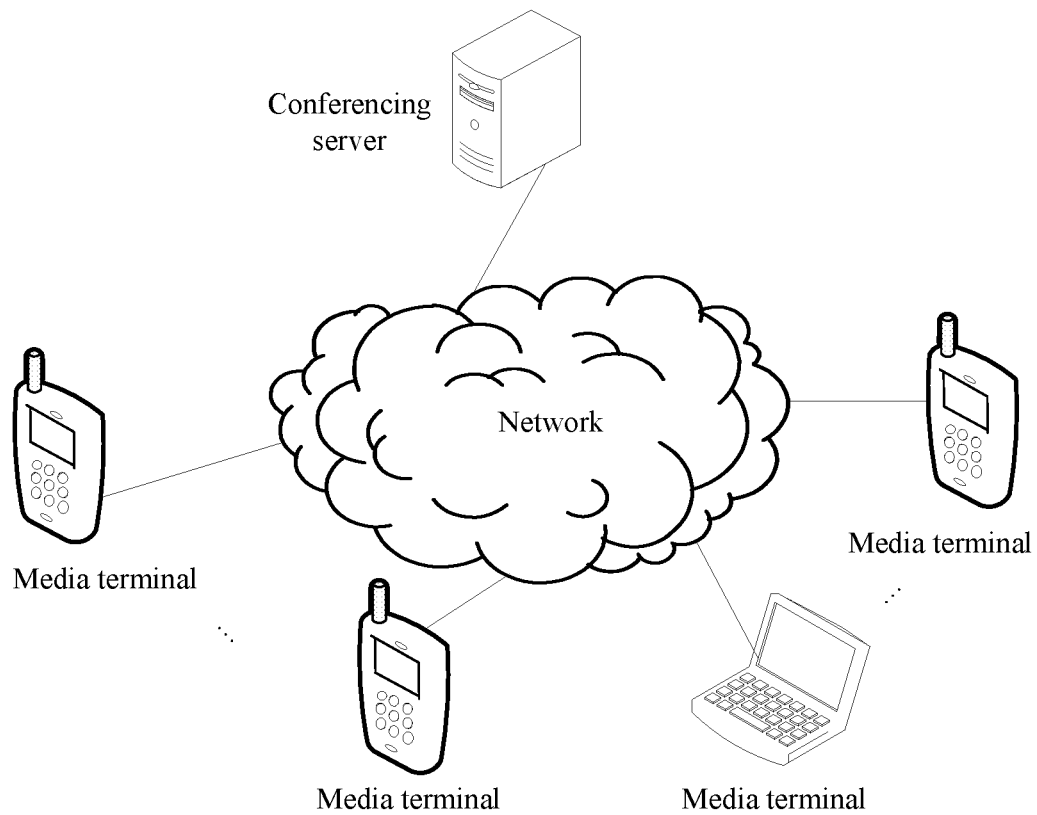
FIG. 1-a
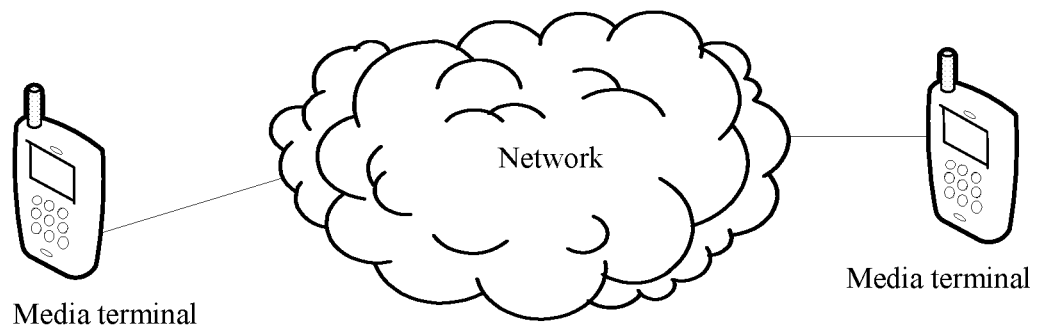
FIG. 1-b

FIG. 1-c

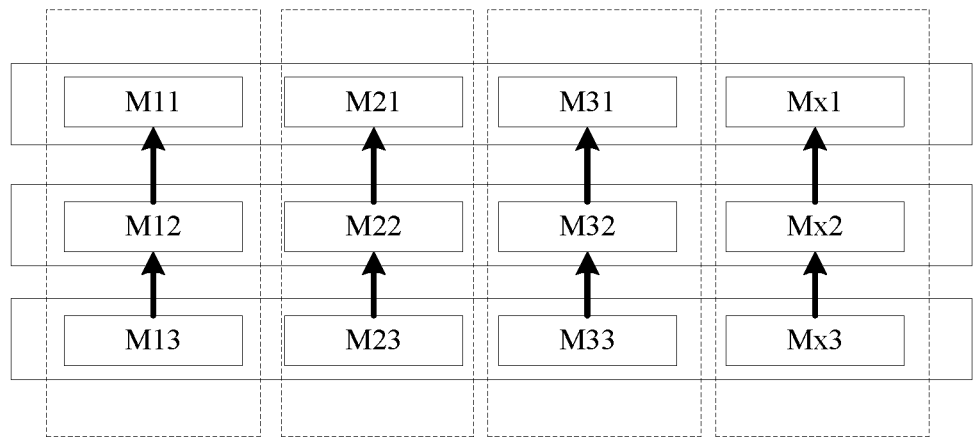
FIG. 7-a
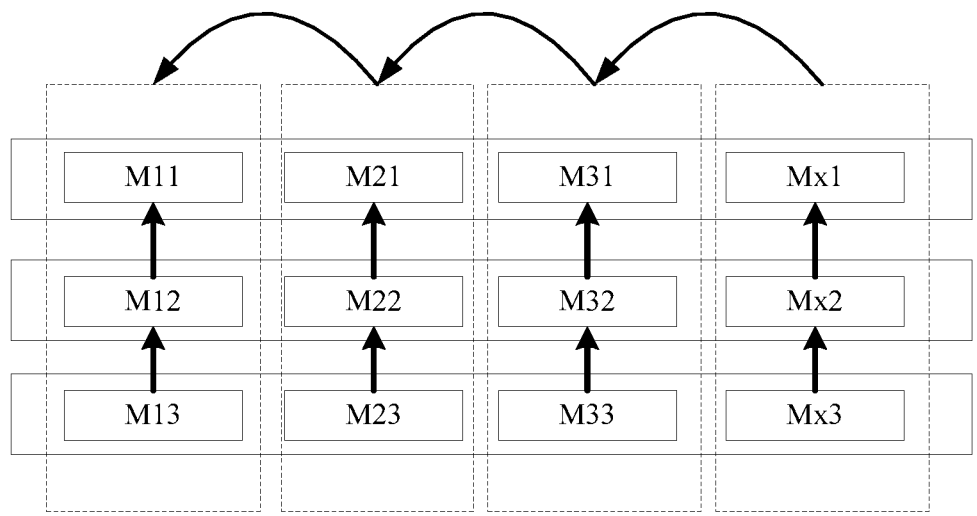
FIG. 7-b
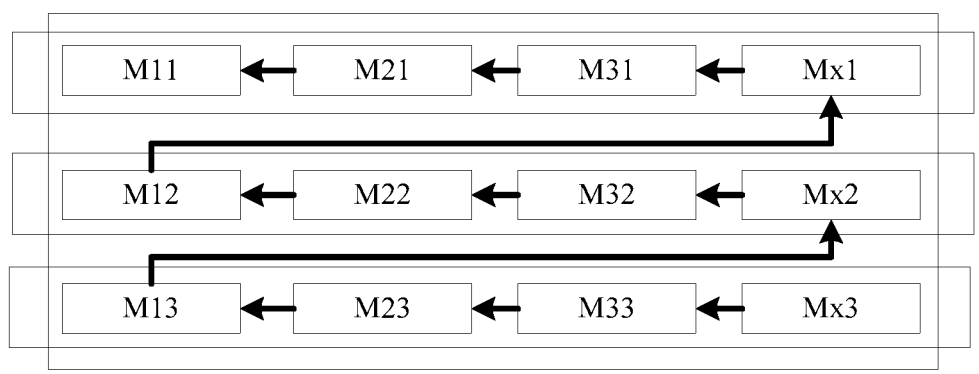
FIG. 7-c

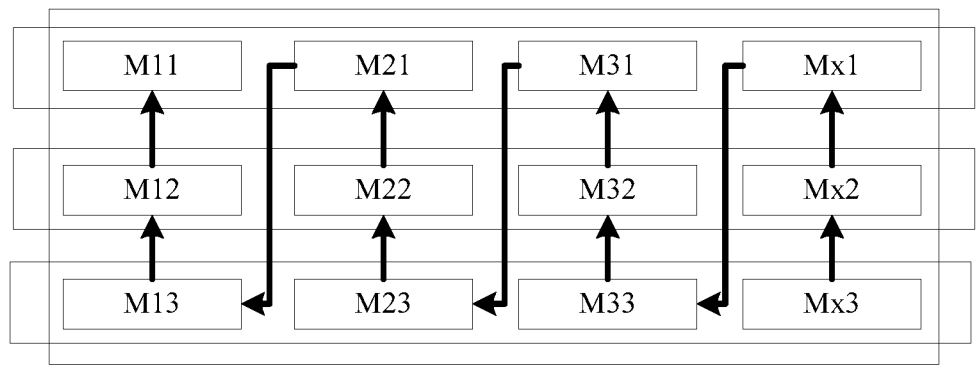
FIG. 7-d
FIG. 7-e
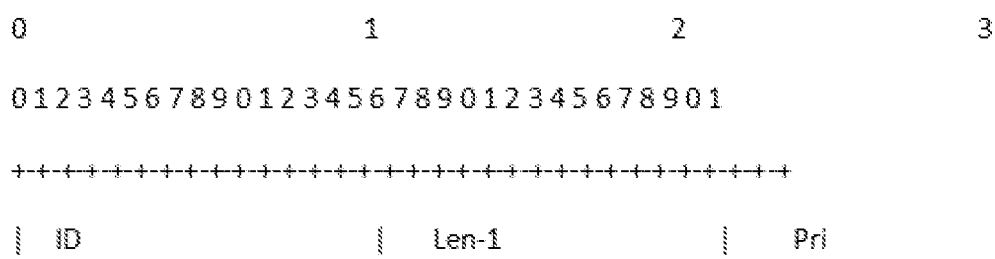
FIG. 7-f

```
 0                   1                   2                   3
 0 1 2 3 4 5 6 7 8 9 0 1 2 3 4 5 6 7 8 9 0 1 2 3 4 5 6 7 8 9 0 1
-+-+-+-+-+-+-+-+-+-+-+-+-+-+-+-+-+-+-+-+-+-+-+-+-+-+-+-+-+-+-+-+
|V=2|P|    SC   |  PT=SDES=202  |             length            |
+=+=+=+=+=+=+=+=+=+=+=+=+=+=+=+=+=+=+=+=+=+=+=+=+=+=+=+=+=+=+=+=+
|                          SSRC/CSRC_1                          |
+-+-+-+-+-+-+-+-+-+-+-+-+-+-+-+-+-+-+-+-+-+-+-+-+-+-+-+-+-+-+-+-+
|                           SDES items                          |
```

MEDIA SESSION PROCESSING METHOD, RELATED DEVICE, AND COMMUNICATIONS SYSTEM

CROSS-REFERENCE TO RELATED APPLICATIONS

This application is continuation of International Application No. PCT/CN2016/079887, filed on Apr. 21, 2016, which claims priority to Chinese Patent Application No. 201510368853.5, filed on Jun. 29, 2015, both of which are hereby incorporated by reference in their entireties.

TECHNICAL FIELD

The present invention relates to the field of network communications technologies, and specifically, to a media session processing method, a related device, and a communications system.

BACKGROUND

In a conventional media session (such as an audio and video conference that is based on a central node) system, a conferencing server located on a central node receives audio and video streams from participating terminals (that is, media terminals). The conferencing server selects a corresponding audio and video stream with reference to a local policy and a receiving capability of another participating terminal, and forwards the audio and video stream to the another participating terminal. In this way, normal audio and video communication is established between the participating terminals.

Sometimes, particular participating terminals may prefer an audio and video media stream of a specific version (for example, a quality version or a format version). Therefore, some participating terminals may encode a media source (such as a video source) into media streams of multiple versions (the media streams of multiple versions may include, for example, a media stream of a standard-definition version, a media stream of a high-definition version, and a media stream of a super-definition version), and the media streams of multiple versions are simulcast in a session. A participating terminal that receives the media streams may select a media stream of a required version from the simulcast media streams of multiple versions for play.

It is found in a research and practice process, that a transmit end of a media stream in the prior art usually simulcasts, in an immoderate manner, media streams of multiple versions of a media source. Consequently, in a case such as transmission path congestion, quality of an entire media session may be severely affected, and further, product experience of a user may be greatly affected.

SUMMARY

Embodiments of the present invention provide a media session processing method, a related device, and a communications system, to ensure quality of a media session as far as possible in a case such as transmission path congestion.

A first aspect of the embodiments of the present invention provides a media session processing method, including:

determining, by a first media device, global priorities of media streams corresponding to N media sources, where N is a positive integer, the N media sources are N media sources that can be provided by the first media device in a media session in which a second media device participates, and one of the N media sources corresponds to at least two media streams used to be simulcast in the media session; and when a transmission path between the first media device and the second media device is congested, performing, by the first media device based on the determined global priorities of the media streams corresponding to the N media sources, congestion control on the media streams corresponding to the N media sources that are sent by the first media device to the second media device.

With reference to the first aspect, in a first possible implementation of the first aspect, the global priorities of the media streams corresponding to the N media sources are determined jointly based on priorities of the N media sources, intra-source priorities of media streams corresponding to each of the N media sources, and priority reference weights, where the priority reference weights are a reference weight of the priorities of the N media sources and a reference weight of the intra-source priorities of the media streams corresponding to each of the N media sources.

With reference to the first aspect, in a second possible implementation of the first aspect, the global priorities of the media streams corresponding to the N media sources are determined jointly based on priorities of the N media sources, and intra-source priorities of media streams corresponding to each of the N media sources.

With reference to the first aspect, or the first possible implementation of the first aspect, or the second possible implementation of the first aspect, in a third possible implementation of the first aspect, the determining, by a first media device, global priorities of media streams corresponding to N media sources includes: determining, by the first media device by negotiating with the second media device, the global priorities of the media streams corresponding to the N media sources.

With reference to the third possible implementation of the first aspect, in a fifth possible implementation of the first aspect, the determining, by the first media device by negotiating with the second media device, the global priorities of the media streams corresponding to the N media sources includes:

sending, by the first media device, a first session message to the second media device, where the first session message includes a priority indicator, and the priority indicator is used to determine global priorities of the media streams corresponding to the N media sources; and receiving, by the first media device, a first session answer message sent by the second media device, where if the first session answer message includes a confirmation indicator for the priority indicator, the global priorities, determined according to the priority indicator, of the media streams corresponding to the N media sources are the global priorities, determined by the first media device, of the media streams corresponding to the N media sources; or sending, by the first media device, a second session message to the second media device, where the second session message includes a priority indicator, and the priority indicator is used to indicate global priorities of the media streams corresponding to the N media sources; receiving, by the first media device, a second session answer message sent by the second media device; and if the second session answer message includes an adjustment indicator for the priority indicator, adjusting, based on the adjustment indicator, the global priorities that are of the media streams corresponding to the N media sources that are indicated by the priority indicator, where the adjusted global priorities of the media streams corresponding to the N media sources are the global priorities, determined by the first media device, of the media streams corresponding to the N media sources.

With reference to the third possible implementation of the first aspect, in a sixth possible implementation of the first aspect, the determining, by the first media device by negotiating with the second media device, the global priorities of the media streams corresponding to the N media sources includes:

receiving, by the first media device, a third session message sent by the second media device, where the third session message includes a priority indicator, and the priority indicator is used to determine global priorities of the media streams corresponding to the N media sources; sending, by the first media device, a third session answer message to the second media device, where the third session answer message includes a confirmation indicator for the priority indicator; and determining, by the first media device based on the priority indicator in the third session message, the global priorities of the media streams corresponding to the N media sources; or receiving, by the first media device, a fourth session message sent by the second media device, where the fourth session message includes a priority indicator, and the priority indicator is used to determine global priorities of the media streams corresponding to the N media sources; and sending, by the first media device, a fourth session answer message to the second media device, where the fourth session answer message includes an adjustment indicator for the priority indicator, and global priorities, adjusted based on the adjustment indicator, of the media streams corresponding to the N media sources are the global priorities, determined by the first media device, of the media streams corresponding to the N media sources.

With reference to either of the fifth to the sixth possible implementations of the first aspect, in a seventh possible implementation of the first aspect, when N is greater than 1, the priority indicator includes a media source priority indicator, a media stream intra-source priority indicator, and a priority reference weight indicator, where the media source priority indicator is used to indicate priorities of different media sources, the media stream intra-source priority indicator is used to indicate intra-source priorities of media streams corresponding to a same media source, and the priority reference weight indicator is used to indicate a reference weight of the media source priority indicator and a reference weight of the media stream intra-source priority indicator.

With reference to the seventh possible implementation of the first aspect, in an eighth possible implementation of the first aspect, when the priority reference weight indicator is used to indicate that the reference weight of the media source priority indicator is higher than the reference weight of the media stream intra-source priority indicator, if a priority of a media source i in the N media sources is higher than a priority of a media source j in the N media sources, a global priority of any media stream corresponding to the media source i is higher than a global priority of any media stream corresponding to the media source j, where the media source i and the media source j are any two media sources in the N media sources.

With reference to the seventh possible implementation of the first aspect, in a ninth possible implementation of the first aspect, when the priority reference weight indicator is used to indicate that the reference weight of the media source priority indicator is lower than the reference weight of the media stream intra-source priority indicator, if a priority of a media source i in the N media sources is higher than a priority of a media source j in the N media sources, and an intra-source priority of a media stream ix corresponding to the media source i is equal to an intra-source priority of a media stream jx corresponding to the media source j, a global priority of the media stream ix is higher than a global priority of the media stream jx, where the media source i and the media source j are any two media sources in the N media sources, the media stream ix corresponding to the media source i is any media stream corresponding to the media source i, and the media stream jx corresponding to the media source j is any media stream corresponding to the media source j; or if a priority of a media source i in the N media sources is higher than a priority of a media source j in the N media sources, an intra-source priority of a media stream ix corresponding to the media source i is equal to an intra-source priority of a media stream jx corresponding to the media source j, and the intra-source priority of the media stream ix is higher than an intra-source priority of a media stream iy corresponding to the media source i, a global priority of the media stream jx is higher than a global priority of the media stream iy, where the media source i and the media source j are any two media sources in the N media sources, the media stream ix and the media stream iy are any two media streams corresponding to the media source i, and the media stream jx corresponding to the media source j is any media stream corresponding to the media source j; or if a priority of a media source i in the N media sources is higher than a priority of a media source j in the N media sources, an intra-source priority of a media stream ix corresponding to the media source i is equal to an intra-source priority of a media stream jx corresponding to the media source j, and the intra-source priority of the media stream ix is lower than an intra-source priority of a media stream iw corresponding to the media source i, a global priority of the media stream jx is lower than a global priority of the media stream iw, where the media source i and the media source j are any two media sources in the N media sources, the media stream ix and the media stream iw are any two media streams corresponding to the media source i, and the media stream jx corresponding to the media source j is any media stream corresponding to the media source j.

With reference to any one of the first aspect, or the first to the ninth possible implementations of the first aspect, in a tenth possible implementation of the first aspect, the performing, based on the determined global priorities of the media streams corresponding to the N media sources, congestion control on the media streams corresponding to the N media sources that are sent by the first media device to the second media device includes: discarding some or all of media data packets of media streams, having relatively low global priorities, in the media streams corresponding to the N media sources that are to be sent by the first media device to the second media device; or delaying sending of some or all of media data packets of media streams, having relatively low global priorities, in the media streams corresponding to the N media sources that are to be sent by the first media device to the second media device.

A second aspect of the embodiments of the present invention provides a media device, including:

a determining unit, configured to determine global priorities of media streams corresponding to N media sources, where N is a positive integer, the N media sources are N media sources that can be provided by the media device in a media session in which a second media device participates, and one of the N media sources corresponds to at least two media streams used to be simulcast in the media session; and a transmission control unit, configured to: when a transmission path between the media device and the second media device is congested, perform, based on the determined global priorities of the media streams corresponding to the N media sources, congestion control on the media streams corresponding to the N media sources that are sent by the media device to the second media device.

With reference to the second aspect, in a first possible implementation of the second aspect, the global priorities of the media streams corresponding to the N media sources are determined jointly based on priorities of the N media sources, intra-source priorities of media streams corresponding to each of the N media sources, and priority reference weights, where the priority reference weights are a reference weight of the priorities of the N media sources and a reference weight of the intra-source priorities of the media streams corresponding to each of the N media sources.

With reference to the second aspect, in a second possible implementation of the second aspect, the global priorities of the media streams corresponding to the N media sources are determined jointly based on priorities of the N media sources, and intra-source priorities of media streams corresponding to each of the N media sources.

It may be learned that in the technical solutions of the embodiments of the present invention, the first media device used as a transmit end first determines the global priorities of the media streams corresponding to the N media sources, and when the transmission path between the first media device and the second media device is congested, the first media device may perform, based on the determined global priorities of the media streams corresponding to the N media sources, congestion control on the media streams corresponding to the N media sources that are sent by the first media device to the second media device. A relatively effective sending management and control mechanism is introduced to perform congestion control on media streams that include media streams to be simulcast that are to be sent by the transmit end, and a congestion control mechanism is determined with reference to the global priorities of the media streams corresponding to the N media sources. Therefore, this helps ensure, as far as possible in a case such as transmission path congestion, reliable transmission of media streams that have relatively high global priorities, helps ensure quality of the media session, and further helps improve product experience of a user.

BRIEF DESCRIPTION OF DRAWINGS

To describe the technical solutions in the embodiments of the present invention more clearly, the following briefly describes the accompanying drawings for describing the embodiments. Apparently, the accompanying drawings in the following description show merely some embodiments of the present invention, and persons of ordinary skill in the art may still derive other drawings from these accompanying drawings without creative efforts.

FIG. 1-*a* to FIG. 1-*c* are schematic diagrams of several network architectures according to an embodiment of the present invention;

FIG. 7-*a* is a schematic diagram of media stream intra-source priority order according to an embodiment of the present invention;

FIG. 7-*b* is a schematic diagram of media source priority order according to an embodiment of the present invention;

FIG. 7-*c* is a schematic diagram of media stream global priority order according to an embodiment of the present invention;

FIG. 7-*d* is a schematic diagram of media stream global priority order according to an embodiment of the present invention;

FIG. 7-*e* is a schematic diagram of media stream global priority order according to an embodiment of the present invention;

FIG. 7-*f* is a schematic diagram of a header format of an RTP packet according to an embodiment of the present invention;

FIG. 7-*g* is a schematic diagram of a header format of an RTCP packet according to an embodiment of the present invention;

DESCRIPTION OF EMBODIMENTS

Figure 2:
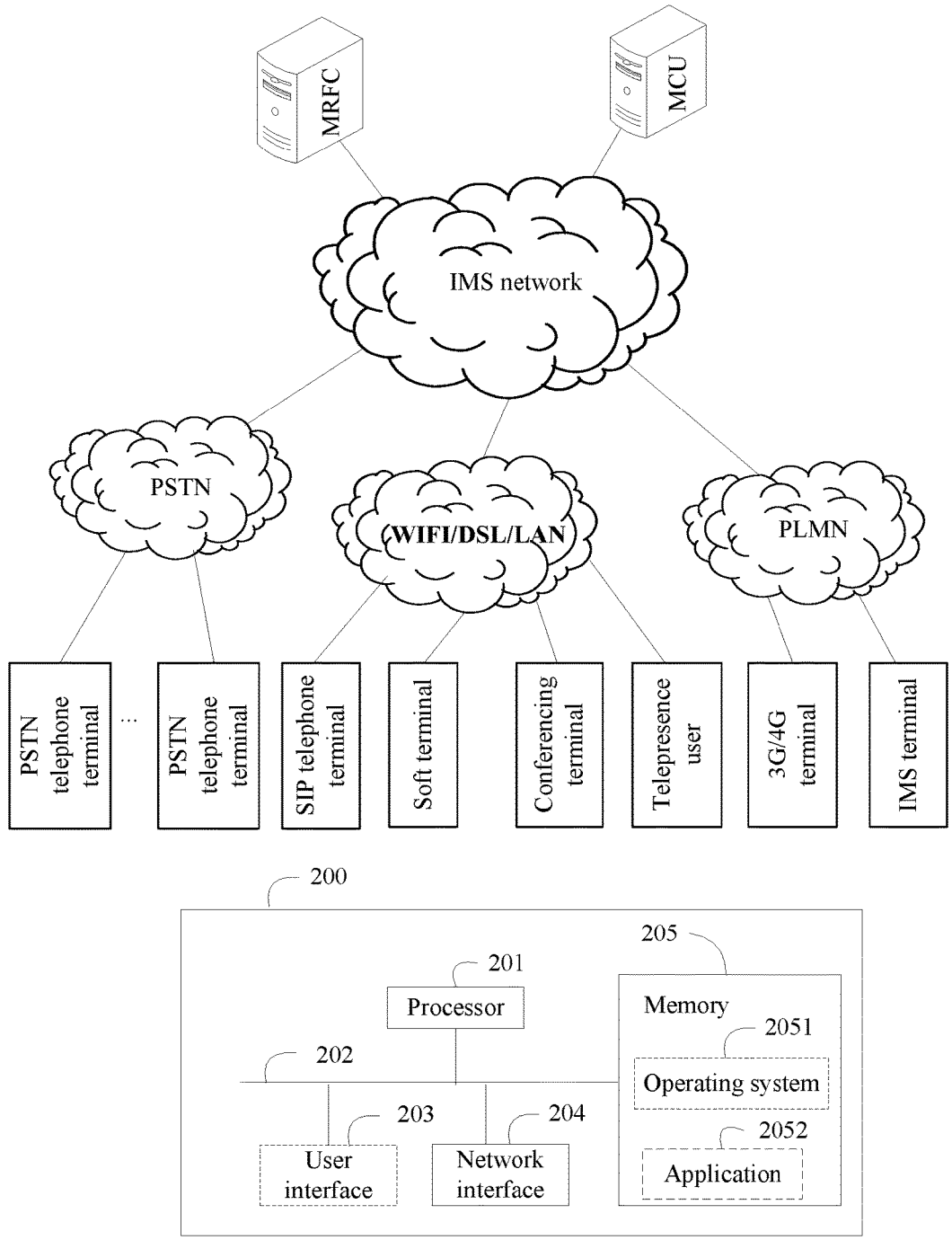
FIG. 2 is a schematic diagram of a media device according to an embodiment of the present invention.

Embodiments of the present invention provide a media session processing method, a related device, and a communications system, to ensure quality of a media session as far as possible in a case such as transmission path congestion.

To make persons in the art understand the technical solutions of the present invention better, the following clearly describes the technical solutions in the embodiments of the present invention with reference to the accompanying drawings in the embodiments of the present invention. Apparently, the described embodiments are merely a part rather than all of the embodiments of the present invention. All other embodiments obtained by persons of ordinary skill in the art based on the embodiments of the present invention without creative efforts shall fall within the protection scope of the present invention.

Detailed descriptions are separately provided below.

In the specification, the claims, and the foregoing accompanying drawings of the present invention, the terms "first", "second", "third", "fourth", and the like are intended to distinguish between different objects but do not indicate particular order. In addition, the terms "include", "have", and any variant thereof are intended to cover a non-exclusive inclusion. For example, a process, a method, a system, a product, or a device that includes a series of steps or units is not limited to the listed steps or units, but In some embodiments further includes an unlisted step or unit, or In some embodiments further includes another inherent step or unit of the process, the method, the product, or the device.

Several network architectures that may be used to implement solutions of the embodiments of the present invention are first introduced below.

Refer to FIG. 1-a to FIG. 1-c. In a network architecture shown in FIG. 1-a, some media terminals (in a conference scenario, the media terminal may be also referred to as a participating terminal or a conferencing terminal) are communicatively connected to a conferencing server, the conferencing server located on a central node may receive audio and video streams and the like from participating terminals (that is, the media terminals), and the conferencing server selects a corresponding audio and video stream with reference to a local policy and a receiving capability of another participating terminal, and forwards the audio and video stream to the another participating terminal. In this way, normal audio and video communication is established between the participating terminals.

In a network architecture shown in FIG. 1-b, two media terminals (in a conference scenario, the media terminal may be also referred to as a participating terminal or a conferencing terminal) are interconnected by using a network, the two participating terminals may exchange audio and video streams and the like by using the network, and the two participating terminals may establish normal audio and video communication without participation of a conferencing server.

A network architecture of a multi-stream communications system shown in FIG. 1-c includes a conferencing server and a multi-stream communications terminal. The conferencing server may be a multipoint control unit (MCU), a multimedia resource function processor (MRFP), or the like.

The multi-stream communications terminal is, for example, a soft terminal, a conferencing terminal, a telepresence user, a 3G/4G terminal, or an IP multimedia subsystem (IMS) terminal. The multi-stream communications terminal itself can generate multiple audio and video streams, and a common Session Initiation Protocol (SIP) telephone terminal or a public switched telephone network (PSTN) telephone terminal can generate only one audio stream. In a point-to-point case, such multi-stream communications terminals capable of generating multiple audio and video streams can communicate with each other without using the MCU. In a point-to-multipoint case, the multi-stream communications terminal capable of generating multiple audio and video streams communicates with other terminals by using the MCU or the MRFP, and the MCU or MRFP is equivalent to a central node of multipoint communication, and is responsible for functions such as forwarding.

Both the media terminal and the conferencing server may be referred to as media devices. A media device for sending a media stream may be referred to as a media stream transmit end (which may be referred to as a transmit end for short), and a media device for receiving a media stream may be referred to as a media stream receive end (which may be referred to as a receive end for short).

The technical solutions in the following embodiments of the present invention may be implemented based on, for example, the network architecture shown in FIG. 1-a, FIG. 1-b, or FIG. 1-c, or a variant network architecture. The following specifically describes some technical solutions in the embodiments of the present invention.

Simulcast is first briefly described below. "Simulcast" means encoding a same media source (such as audio or a video) into multiple independent media streams (the multiple independent media streams may have different resolution, different bit rates, and/or different code types) by using different coding schemes, and then simultaneously sending the multiple independent media streams.

Referring to FIG. 2, FIG. 2 is a structural block diagram of a media device 200 according to an embodiment of the present invention. The media device 200 may include at least one processor 201, a memory 205, and at least one communications bus 202. The at least one communications bus 202 is used to implement connection and communication between these components.

The media device 200 further includes at least one network interface 204.

The media device 200 may In some embodiments include at least one user interface 203.

In some embodiments, the at least one user interface 203 may include a display (the display is, for example, a touch screen, a liquid crystal display (LCD), holographic (Holographic), a cathode ray tube (CRT, Cathode Ray Tube), or a projector (Projector)), a clicking device (such as a mouse, a trackball (trackball), a touch panel, or a touch screen), a camera, a sound pickup apparatus, and/or the like.

The memory 205 may include a read-only memory and a random access memory, and provides an instruction and data for the processor 201. In some embodiments, a part of the memory 205 may further include a non-volatile random access memory.

In some embodiments, in some possible implementations, the memory 205 stores the following elements, executable modules or data structures, or subsets thereof, or extended sets thereof: an operating system 2051 and an application module 2052.

The operating system 2051 may include various system programs that are used to implement various basic services and process hardware-based tasks. The application module 2052 may include various application programs that are used to implement various application services.

In this embodiment of the present invention, by invoking a program or the instruction stored in the memory 205, the processor 201 may be configured to perform the following steps: determining global priorities of media streams corresponding to N media sources, where N is a positive integer, the N media sources are N media sources that can be provided by the media device in a media session in which a second media device participates, and one of the N media sources corresponds to at least two media streams used to be simulcast in the media session; and when a transmission path between the media device and the second media device is congested, performing, based on the determined global priorities of the media streams corresponding to the N media sources, congestion control on the media streams corresponding to the N media sources that are sent by the media device to the second media device.

In embodiments of the present invention, congestion take place when, for example, a delay occurs, and/or a packet loss rate exceeds a first threshold (the first threshold is equal to, for example, 5%, 8%, 2%, or another value). Alternatively, congestion may take place when remaining bandwidth is less than a second threshold (the second threshold may be equal to, for example, 100 Kbps, 200 Kbps, 1000 bps, or another value). Alternatively, congestion may take place when bandwidth usage is higher than a third threshold (the third threshold is equal to, for example, 85%, 90%, 95%, 98%, or another value). Certainly, whether congestion occurs may be defined in another manner. In general, congestion indicates that a strain on resources is about to occur or a strain on resources has already occurred. In a specific application scenario, cases indicating congestion may be defined according to specific requirements.

It may be understood that "global" in the global priorities is for a media stream set including multiple media streams. For example, the media stream set may include all media streams corresponding to N media sources, or the media stream set may include all media streams corresponding to all media sources that can be provided by the media device 200 in the media session in which the second media device participates, or the media stream set may include all media streams corresponding to all media sources in a media session in which the second media device and the media device 200 participate, or the media stream set may include all media streams corresponding to all media sources that can be provided by the media device 200, or the media stream set may include all media streams that may be received by the second media device, or the media stream set may include all media streams that may be received, by the second media device, in a media session in which the media device 200 participates.

Certainly, the media stream set corresponding to "global" in the global priorities may be formed by using other media streams, which may include at least all media streams corresponding to the N media sources.

A media stream corresponding to a media source is a media stream obtained after the media source is encoded. If the media source is encoded into multiple media streams, the media source corresponds to multiple media streams (the multiple media streams may include, for example, a media stream of a standard-definition version, a media stream of a high-definition version, and/or a media stream of a super-definition version). If the media source is encoded into only one media stream, the media source corresponds to only one media stream.

In some possible implementations of the present invention, in addition to the first media device and the second media device, media devices participating in the session may further include one or more other media devices.

In some possible implementations of the present invention, when the media device 200 is a conferencing server, the second media device is a media terminal, or when the media device 200 is a media terminal, the second media device may be a media terminal or a conferencing server.

For example, N may be an integer greater than or equal to 1.

For example, N may be equal to 1, 2, 3, 4, 5, 6, 8, 10, 15, 19, 21, 30, 500, or another value.

In some possible implementations of the present invention, the global priorities of the media streams corresponding to the N media sources may be determined jointly based on priorities of the N media sources, intra-source priorities of media streams corresponding to each of the N media sources, and priority reference weights. The priority reference weights are a reference weight of the priorities of the N media sources and a reference weight of the intra-source priorities of the media streams corresponding to each of the N media sources.

In some possible implementations of the present invention, the global priorities of the media streams corresponding to the N media sources are determined jointly based on priorities of the N media sources and intra-source priorities of media streams corresponding to each of the N media sources.

In some possible implementations of the present invention, the processor 201 may be, for example, configured to determine, by negotiating with the second media device, the global priorities of the media streams corresponding to the N media sources.

In some possible implementations of the present invention, the processor 201 may be further configured to: determine, according to a user priority setting instruction, the global priorities of the media streams corresponding to the N media sources; or determine, according to a preconfigured priority determining policy, the global priorities of the media streams corresponding to the N media sources.

In some possible implementations of the present invention, the processor 201 may be configured to: send a first session message to the second media device, where the first session message includes a priority indicator, and the priority indicator is used to determine global priorities of the media streams corresponding to the N media sources; and receive a first session answer message sent by the second media device, where if the first session answer message includes a confirmation indicator for the priority indicator, the global priorities, determined according to the priority indicator, of the media streams corresponding to the N media sources are the global priorities, determined by the processor 201, of the media streams corresponding to the N media sources; or the processor 201 may be configured to: send a second session message to the second media device, where the second session message includes a priority indicator, and the priority indicator is used to determine global priorities of the media streams corresponding to the N media sources; receive a second session answer message sent by the second media device; and if the second session answer message includes an adjustment indicator for the priority indicator, adjust, based on the adjustment indicator, the global priorities that are of the media streams corresponding to the N media sources that are indicated by the priority indicator, where the adjusted global priorities of the media streams corresponding to the N media sources are the global priorities, determined by the processor 201, of the media streams corresponding to the N media sources; or the processor 201 may be configured to: receive a third session message sent by the second media device, where the third session message includes a priority indicator, and the priority indicator is used to determine global priorities of the media streams corresponding to the N media sources; send a third session answer message to the second media device, where the third session answer message includes a confirmation indicator for the priority indicator; and determine, based on the priority indicator in the third session message, the global priorities of the media streams corresponding to the N media sources; or the processor 201 may be configured to: receive a fourth session message sent by the second media device, where the fourth session message includes a priority indicator, and the priority indicator is used to determine global priorities of the media streams corresponding to the N media sources; the media device sends a fourth session answer message to the second media device, where the fourth session answer message includes an adjustment indicator for the priority indicator, and global priorities, adjusted based on the adjustment indicator, of the media streams corresponding to the N media sources are the global priorities, determined by the media device, of the media streams corresponding to the N media sources.

In some possible implementations of the present invention, the first session message, the second session message, the first session answer message, or the second session answer message further includes a port multiplexing instruction, and the port multiplexing instruction is used to instruct to transmit, by using a same port address, media streams that have a same intra-source priority and corresponding to different media sources.

In some possible implementations of the present invention, the third session message, the fourth session message, the third session answer message, or the fourth session answer message further includes a port multiplexing instruction, and the port multiplexing instruction is used to instruct to transmit, by using a same port address, media streams that have a same intra-source priority and corresponding to different media sources.

In some possible implementations of the present invention, the first session message or the second session message may further include a media description, and the media description may be used to indicate the N media sources. In some embodiments, in some possible implementations of the present invention, the first session answer message or the second session answer message may further include a confirmation indicator for the media description.

In some possible implementations of the present invention, the first session message or the second session message may further include a simulcast indicator, and the simulcast indicator is used to indicate that at least one of the N media sources supports simulcast. In some embodiments, in some possible implementations of the present invention, the first session answer message or the second session answer message may further include a confirmation indicator for the simulcast indicator.

In some possible implementations of the present invention, the third session message or the fourth session message may further include a media description, and the media description may be used to indicate the N media sources. In some embodiments, in some possible implementations of the present invention, the third session answer message or the fourth session answer message may further include a confirmation indicator for the media description.

In some possible implementations of the present invention, the third session message or the fourth session message may further include a simulcast indicator, and the simulcast indicator is used to indicate that at least one of the N media sources supports simulcast. In some embodiments, in some possible implementations of the present invention, the third session answer message or the fourth session answer message may further include a confirmation indicator for the simulcast indicator.

The first session answer message is used to respond to the first session message. The second session answer message is used to respond to the second session message. The third session answer message is used to respond to the third session message. The fourth session answer message is used to respond to the fourth session message.

The first session message may be a message used to request session setup, a message used to request session update, or another session message. The second session message may be a message used to request session setup, a message used to request session update, or another session message. The third session message may be a message used to request session setup, a message used to request session update, or another session message. The fourth session message may be a message used to request session setup, a message used to request session update, or another session message.

In some possible implementations of the present invention, the first session message may be, for example, a Session Description Protocol (SDP) offer (offer) message or a session message of another type. Certainly, when the first session message is the SDP offer message, the first session answer message may be an SDP answer (answer) message.

In some possible implementations of the present invention, the second session message may be, for example, an SDP offer message or a session message of another type. Certainly, when the second session message is the SDP offer message, the second session answer message may be an SDP answer message.

In some possible implementations of the present invention, the third session message may be, for example, an SDP offer message or a session message of another type. Certainly, when the third session message is the SDP offer message, the third session answer message may be an SDP answer message.

In some possible implementations of the present invention, the fourth session message may be, for example, an SDP offer message or a session message of another type. Certainly, when the fourth session message is the SDP offer message, the fourth session answer message may be an SDP answer message.

In some possible implementations of the present invention, when N is equal to 1, the priority indicator includes a media stream intra-source priority indicator, and the media stream intra-source priority indicator is used to indicate intra-source priorities of media streams corresponding to a same media source.

In some possible implementations of the present invention, when N is greater than 1, the priority indicator includes a media source priority indicator, a media stream intra-source priority indicator, and a priority reference weight indicator. The media source priority indicator is used to indicate priorities of different media sources. The media stream intra-source priority indicator is used to indicate intra-source priorities of media streams corresponding to a same media source. The priority reference weight indicator is used to indicate a reference weight of the media source priority indicator and a reference weight of the media stream intra-source priority indicator.

In some possible implementations of the present invention, when the priority reference weight indicator is used to indicate that the reference weight of the media source priority indicator is higher than the reference weight of the media stream intra-source priority indicator, if a priority of a media source i in the N media sources is higher than a priority of a media source j in the N media sources, a global priority of any media stream corresponding to the media source i is higher than a global priority of any media stream corresponding to the media source j, where the media source i and the media source j are any two media sources in the N media sources.

In some possible implementations of the present invention, when the priority reference weight indicator is used to indicate that the reference weight of the media source priority indicator is lower than the reference weight of the media stream intra-source priority indicator, if a priority of a media source i in the N media sources is higher than a priority of a media source j in the N media sources, and an intra-source priority of a media stream ix corresponding to the media source i is equal to an intra-source priority of a media stream jx corresponding to the media source j, a global priority of the media stream ix is higher than a global priority of the media stream jx, where the media source i and the media source j are any two media sources in the N media sources, the media stream ix corresponding to the media source i is any media stream corresponding to the media source i, and the media stream jx corresponding to the media source j is any media stream corresponding to the media source j; or if a priority of a media source i in the N media sources is higher than a priority of a media source j in the N media sources, an intra-source priority of a media stream ix corresponding to the media source i is equal to an intra-source priority of a media stream jx corresponding to the media source j, and the intra-source priority of the media stream ix is higher than an intra-source priority of a media stream iy in the media source i, a global priority of the media stream jx is higher than a global priority of the media stream iy, where the media source i and the media source j are any two media sources in the N media sources, the media stream ix and the media stream iy are any two media streams corresponding to the media source i, and the media stream jx corresponding to the media source j is any media stream corresponding to the media source j; or if a priority of a media source i in the N media sources is higher than a priority of a media source j in the N media sources, an intra-source priority of a media stream ix corresponding to the media source i is equal to an intra-source priority of a media stream jx corresponding to the media source j, and the intra-source priority of the media stream ix is lower than an intra-source priority of a media stream iw in the media source i, a global priority of the media stream jx is lower than a global priority of the media stream iw, where the media source i and the media source j are any two media sources in the N media sources, the media stream ix and the media stream iw are any two media streams corresponding to the media source i, and the media stream jx corresponding to the media source j is any media stream corresponding to the media source j.

In some possible implementations of the present invention, the processor 201 is configured to: when the transmission path between the media device and the second media device is congested, discard some or all of media data packets of media streams, having relatively low global priorities, in the media streams corresponding to the N media sources that are to be sent by the media device to the second media device; or when the transmission path between the media device and the second media device is congested, delay sending of some or all of media data packets of media streams, having relatively low global priorities, in the media streams corresponding to the N media sources that are to be sent by the media device to the second media device.

It may be learned that in the technical solution of this embodiment, the media device 200 used as a transmit end first determines the global priorities of the media streams corresponding to the N media sources, and when it is determined that the transmission path between the media device 200 and the second media device is congested, the media device 200 may perform, based on the determined global priorities of the media streams corresponding to the N media sources, congestion control on the media streams corresponding to the N media sources that are sent by the media device 200 to the second media device. A relatively effective sending management and control mechanism is introduced to perform congestion control on media streams that include media streams to be simulcast that are to be sent by the transmit end, and a congestion control mechanism is determined with reference to the global priorities of the media streams corresponding to the N media sources. Therefore, this helps ensure, as far as possible in a case such as transmission path congestion, reliable transmission of media streams that have relatively high global priorities, further helps ensure quality of the media session, and further helps improve product experience of a user.

It may be understood that functions of function modules of the media device 200 in this embodiment and a mechanism of interaction between the media device and another device may be implemented according to a method in method embodiments. For a specific implementation process thereof, refer to related descriptions of the following method embodiments. Details are not repeated herein.

Figure 3:
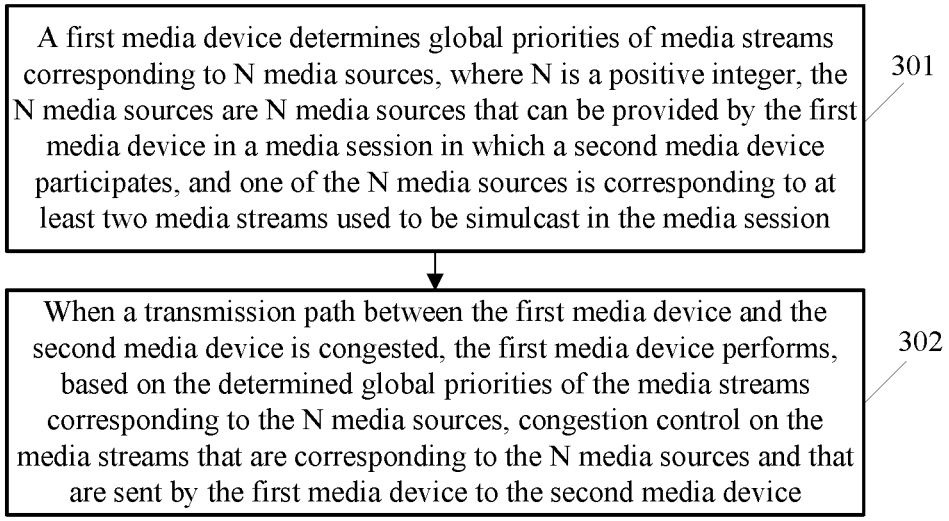
FIG. 3 is a schematic flowchart of a media session processing method according to an embodiment of the present invention.

Referring to FIG. 3, FIG. 3 is a schematic flowchart of a media session processing method according to an embodiment of the present invention. As shown in FIG. 3, the media session processing method provided in this embodiment of the present invention may include the following steps.

301. A first media device determines global priorities of media streams corresponding to N media sources.

N is a positive integer (for example, N may be an integer greater than or equal to 1). The N media sources are N media sources that can be provided by the first media device in a media session in which a second media device participates, and at least one of the N media sources is separately corresponding to at least two media streams used to be simulcast in the media session.

In some possible implementations of the present invention, in addition to the first media device and the second media device, media devices participating in the session may further include one or more other media devices.

In some possible implementations of the present invention, when the first media device is a conferencing server, the second media device is a media terminal, or when the first media device is a media terminal, the second media device may be a media terminal or a conferencing server.

For example, N may be equal to 1, 2, 3, 4, 5, 6, 8, 10, 15, 19, 21, 30, 500, or another value.

It should be understood that, that one of the N media sources corresponds to at least two media streams used to be simulcast in the media session may indicate that only one of the N media sources corresponds to at least two media streams used to be simulcast in the media session, or may indicate that n media sources in the N media sources are each corresponding to at least two media streams used to be simulcast in the media session, and n is an integer that is greater than 1 and less than or equal to N. For example, assuming that N is equal to 3, that one of the N media sources corresponds to at least two media streams used to be simulcast in the media session may indicate that only one of the N media sources corresponds to at least two media streams used to be simulcast in the media session, or may indicate that two of the N media sources are each corresponding to at least two media streams used to be simulcast in the media session, or may indicate that each of the N media sources corresponds to at least two media streams used to be simulcast in the media session.

For example, n may be equal to 2, 3, 4, 5, 6, 8, 10, 15, 19, 21, 30, 499, 500, or another value.

302. When determining that a transmission path between the first media device and a second media device is congested, the first media device performs, based on the determined global priorities of the media streams corresponding to the N media sources, congestion control on the media streams corresponding to the N media sources that are sent by the first media device to the second media device.

It may be understood that "global" in the global priorities is for a media stream set including multiple media streams. For example, the media stream set may include all media streams corresponding to N media sources, or the media stream set may include all media streams corresponding to all media sources that can be provided by the first media device in the media session in which the second media device participates, or the media stream set may include all media streams corresponding to all media sources in a media session in which the second media device and the first media device participate, or the media stream set may include all media streams corresponding to all media sources that can be provided by the first media device, or the media stream set may include all media streams that may be received by the second media device, or the media stream set may include all media streams that may be received, by the second media device, in a media session in which the first media device participates.

Certainly, the media stream set that "global" in the global priorities is for may be formed by using other media streams. The media stream set that "global" in the global priorities is for includes at least all media streams corresponding to the N media sources.

A media stream corresponding to a media source is a media stream obtained after the media source is encoded. If the media source is encoded into multiple media streams, the media source corresponds to multiple media streams (the multiple media streams may include, for example, a media stream of a standard-definition version, a media stream of a high-definition version, and a media stream of a super-definition version). If the media source is encoded into only one media stream, the media source corresponds to only one media stream.

A main objective of the performing, based on the determined global priorities of the media streams corresponding to the N media sources, congestion control on the media streams corresponding to the N media sources that are sent by the first media device to the second media device is to help ensure quality of a related session as far as possible in a case such as transmission path congestion, for example, ensure, as far as possible in the case such as transmission path congestion, reliable transmission of media streams that have relatively high global priorities. Therefore, multiple congestion control manners that help ensure, as far as possible in the case such as transmission path congestion, reliable transmission of media streams that have relatively high global priorities may be considered and used as some possible implementations of the present invention.

Specifically, for example, the performing, based on the determined global priorities of the media streams corresponding to the N media sources, congestion control on the media streams corresponding to the N media sources that are sent by the first media device to the second media device includes: discarding some or all of media data packets of media streams, having relatively low global priorities, in the media streams corresponding to the N media sources that are to be sent by the first media device to the second media device; or delaying sending of some or all of media data packets of media streams, having relatively low global priorities, in the media streams corresponding to the N media sources that are to be sent by the first media device to the second media device.

It may be learned that in the technical solution of this embodiment, the first media device used as a transmit end first determines the global priorities of the media streams corresponding to the N media sources, and when the transmission path between the first media device and the second media device is congested, the first media device may perform, based on the determined global priorities of the media streams corresponding to the N media sources, congestion control on the media streams corresponding to the N media sources that are sent by the first media device to the second media device. A relatively effective sending management and control mechanism is introduced to perform congestion control on media streams that include media streams to be simulcast that are to be sent by the transmit end, and a congestion control mechanism is determined with reference to the global priorities of the media streams corresponding to the N media sources. Therefore, this helps ensure, as far as possible in a case such as transmission path congestion, reliable transmission of media streams that have relatively high global priorities, further helps ensure quality of a related session, and further helps improve product experience of a user.

The global priorities of the media streams corresponding to the N media sources may be determined jointly based on parameters in multiple aspects.

For example, in some possible implementations of the present invention, the global priorities of the media streams corresponding to the N media sources may be determined jointly based on priorities of the N media sources, intra-source priorities of media streams corresponding to each of the N media sources, and priority reference weights. The priority reference weights are a reference weight of the priorities of the N media sources and a reference weight of the intra-source priorities of the media streams corresponding to each of the N media sources.

For another example, in some possible implementations of the present invention, the global priorities of the media streams corresponding to the N media sources are determined jointly based on priorities of the N media sources, and intra-source priorities of media streams corresponding to each of the N media sources.

In some possible implementations of the present invention, the determining, by a first media device, global priorities of media streams corresponding to N media sources may include: determining, by the first media device according to a user priority setting instruction, the global priorities of the media streams corresponding to the N media sources; or determining, by the first media device according to a pre-configured priority determining policy, the global priorities of the media streams corresponding to the N media sources.

In some possible implementations of the present invention, the determining, by a first media device, global priorities of media streams corresponding to N media sources may include: determining, by the first media device by negotiating with the second media device, the global priorities of the media streams corresponding to the N media sources. The first media device may determine, by negotiating with the second media device, the global priorities of the media streams corresponding to the N media sources in various manners.

For example, the determining, by the first media device by negotiating with the second media device, the global priorities of the media streams corresponding to the N media sources may include:

sending, by the first media device, a first session message to the second media device, where the first session message includes a priority indicator, and the priority indicator is used to determine global priorities of the media streams corresponding to the N media sources; and receiving, by the first media device, a first session answer message sent by the second media device, where if the first session answer message includes a confirmation indicator for the priority indicator, the global priorities, determined according to the priority indicator, of the media streams corresponding to the N media sources are the global priorities, determined by the first media device, of the media streams corresponding to the N media sources; or sending, by the first media device, a second session message to the second media device, where the second session message includes a priority indicator, and the priority indicator is used to indicate global priorities of the media streams corresponding to the N media sources; receiving, by the first media device, a second session answer message sent by the second media device; and if the second session answer message includes an adjustment indicator for the priority indicator, adjusting, based on the adjustment indicator, the global priorities that are of the media streams corresponding to the N media sources that are indicated by the priority indicator, where the adjusted global priorities of the media streams corresponding to the N media sources are the global priorities, determined by the first media device, of the media streams corresponding to the N media sources; or receiving, by the first media device, a third session message sent by the second media device, where the third session message includes a priority indicator, and the priority indicator is used to determine global priorities of the media streams corresponding to the N media sources; sending, by the first media device, a third session answer message to the second media device, where the third session answer message includes a confirmation indicator for the priority indicator; and determining, by the first media device based on the priority indicator in the third session message, the global priorities of the media streams corresponding to the N media sources; or receiving, by the first media device, a fourth session message sent by the second media device, where the fourth session message includes a priority indicator, and the priority indicator is used to determine global priorities of the media streams corresponding to the N media sources; and sending, by the first media device, a fourth session answer message to the second media device, where the fourth session answer message includes an adjustment indicator for the priority indicator, and global priorities, adjusted based on the adjustment indicator, of the media streams corresponding to the N media sources are the global priorities, determined by the first media device, of the media streams corresponding to the N media sources.

In some possible implementations of the present invention, the first session message, the second session message, the first session answer message, or the second session answer message further includes a port multiplexing instruction, and the port multiplexing instruction is used to instruct to transmit, by using a same port address, media streams that have a same intra-source priority and corresponding to different media sources. In a testing and practice process, it is found that, if a media transmit end transmits, by using a same port address, media streams that have a same intra-source priority and corresponding to different media sources, port consumption caused by transmission of redundant code by using each port can be reduced.

In some possible implementations of the present invention, the first session message or the second session message may further include a media description, and the media description may be used to indicate the N media sources. In some embodiments, in some possible implementations of the present invention, the first session answer message or the second session answer message may further include a confirmation indicator for the media description.

In some possible implementations of the present invention, the first session message or the second session message may further include a simulcast indicator, and the simulcast indicator is used to indicate that at least one of the N media sources supports simulcast. In some embodiments, in some possible implementations of the present invention, the first session answer message or the second session answer message may further include a confirmation indicator for the simulcast indicator.

In some possible implementations of the present invention, the third session message, the fourth session message, the third session answer message, or the fourth session answer message further includes a port multiplexing instruction, and the port multiplexing instruction is used to instruct to transmit, by using a same port address, media streams that have a same intra-source priority and corresponding to different media sources.

In some possible implementations of the present invention, the third session message or the fourth session message may further include a media description, and the media description may be used to indicate the N media sources. In some embodiments, in some possible implementations of the present invention, the third session answer message or the fourth session answer message may further include a confirmation indicator for the media description.

In some possible implementations of the present invention, the third session message or the fourth session message may further include a simulcast indicator, and the simulcast indicator is used to indicate that at least one of the N media sources supports simulcast. In some possible implementations of the present invention, the third session answer message or the fourth session answer message may further include a confirmation indicator for the simulcast indicator.

The first session answer message is used to respond to the first session message. The second session answer message is used to respond to the second session message. The third session answer message is used to respond to the third session message. The fourth session answer message is used to respond to the fourth session message.

The first session message may be a message used to request session setup, a message used to request session update, or another session message. The second session message may be a message used to request session setup, a message used to request session update, or another session message. The third session message may be a message used to request session setup, a message used to request session update, or another session message. The fourth session message may be a message used to request session setup, a message used to request session update, or another session message.

In some possible implementations of the present invention, the first session message may be, for example, an SDP offer message or a session message of another type. When the first session message is the SDP offer message, the first session answer message may be an SDP answer message.

In some possible implementations of the present invention, the second session message may be, for example, an SDP offer message or a session message of another type. Certainly, when the second session message is the SDP offer message, the second session answer message may be an SDP answer message.

In some possible implementations of the present invention, the third session message may be, for example, an SDP offer message or a session message of another type. Certainly, when the third session message is the SDP offer message, the third session answer message may be an SDP answer message.

In some possible implementations of the present invention, the fourth session message may be, for example, an SDP offer message or a session message of another type. Certainly, when the fourth session message is the SDP offer message, the fourth session answer message may be an SDP answer message.

In some possible implementations of the present invention, when N is equal to 1, the priority indicator includes a media stream intra-source priority indicator, and the media stream intra-source priority indicator is used to indicate intra-source priorities of media streams corresponding to a same media source.

In some possible implementations of the present invention, when N is greater than 1, the priority indicator includes a media source priority indicator, a media stream intra-source priority indicator, and a priority reference weight indicator. The media source priority indicator is used to indicate priorities of different media sources. The media stream intra-source priority indicator is used to indicate intra-source priorities of media streams corresponding to a same media source. The priority reference weight indicator is used to indicate a reference weight of the media source priority indicator and a reference weight of the media stream intra-source priority indicator.

In some possible implementations of the present invention, when the priority reference weight indicator is used to indicate that the reference weight of the media source priority indicator is higher than the reference weight of the media stream intra-source priority indicator, if a priority of a media source i in the N media sources is higher than a priority of a media source j in the N media sources, a global priority of any media stream corresponding to the media source i is higher than a global priority of any media stream corresponding to the media source j. The media source i and the media source j are any two media sources of the N media sources.

In some possible implementations of the present invention, when the priority reference weight indicator is used to indicate that the reference weight of the media source priority indicator is lower than the reference weight of the media stream intra-source priority indicator, if a priority of a media source i in the N media sources is higher than a priority of a media source j in the N media sources, and an intra-source priority of a media stream ix corresponding to the media source i is equal to an intra-source priority of a media stream jx corresponding to the media source j, a global priority of the media stream ix is higher than a global priority of the media stream jx, where the media source i and the media source j are any two media sources in the N media sources, the media stream ix corresponding to the media source i is any media stream corresponding to the media source i, and the media stream jx corresponding to the media source j is any media stream corresponding to the media source j; or if a priority of a media source i in the N media sources is higher than a priority of a media source j in the N media sources, an intra-source priority of a media stream ix corresponding to the media source i is equal to an intra-source priority of a media stream jx corresponding to the media source j, and the intra-source priority of the media stream ix is higher than an intra-source priority of a media stream iy in the media source i, a global priority of the media stream jx is higher than a global priority of the media stream iy, where the media source i and the media source j are any two media sources in the N media sources, the media stream ix and the media stream iy are any two media streams corresponding to the media source i, and the media stream jx corresponding to the media source j is any media stream corresponding to the media source j; or if a priority of a media source i in the N media sources is higher than a priority of a media source j in the N media sources, an intra-source priority of a media stream ix corresponding to the media source i is equal to an intra-source priority of a media stream jx corresponding to the media source j, and the intra-source priority of the media stream ix is lower than an intra-source priority of a media stream iw in the media source i, a global priority of the media stream jx is lower than a global priority of the media stream iw, where the media source i and the media source j are any two media sources in the N media sources, the media stream ix and the media stream iw are any two media streams corresponding to the media source i, and the media stream jx corresponding to the media source j is any media stream corresponding to the media source j.

It may be understood that the foregoing example provides possible manners of determining media streams global priorities with reference to the priority reference weight indicator, the media source priority indicator, and the media stream intra-source priority indicator. However, actual application is not limited to the manners in the example.

For better understanding and implementation of the foregoing solutions in the embodiments of the present invention, examples for description are provided below by using some specific application scenarios.

Figure 4:
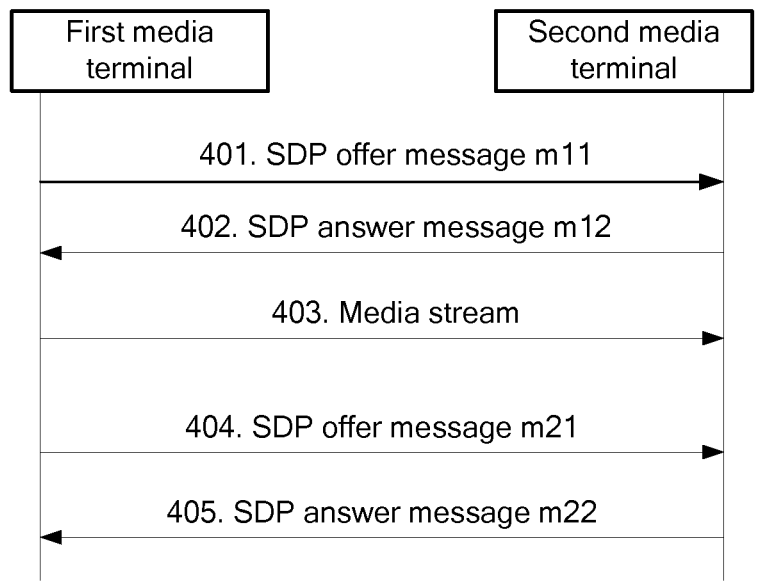
FIG. 4 is a schematic flowchart of another media session processing method according to an embodiment of the present invention.

Referring to FIG. 4, FIG. 4 is a schematic flowchart of another media session processing method according to another embodiment of the present invention. This embodiment is described by using examples mainly for a point-to-point application scenario, and a corresponding network architecture may be shown in FIG. 1-*b* as an example.

As shown in FIG. 4, the another media session processing method provided in the another embodiment of the present invention may include the following steps.

401. A first media terminal sends an SDP offer message m11 to a second media terminal.

The SDP offer message m11 may be considered as a specific example of a session message (for example, a first session message or a second session message) mentioned in the foregoing embodiment.

The SDP offer message m11 may include a media description, a simulcast indicator, a port multiplexing instruction, a priority indicator, and/or the like.

The media description may be used to indicate N media sources, and the N media sources are N media sources that can be provided by the first media terminal in a media session in which the second media terminal participates. At least one of the N media sources separately corresponds to at least two media streams used to be simulcast in the media session.

In this embodiment, for example, N is an integer greater than 1.

For example, N may be equal to 352, 2, 3, 4, 5, 6, 8, 10, 15, 19, 21, 30, 500, or another value.

The priority indicator includes a media source priority indicator, a media stream intra-source priority indicator, and a priority reference weight indicator, and the priority indicator is used to determine global priorities of media streams corresponding to the N media sources.

The media source priority indicator is used to indicate priorities of the N media sources. The media stream intra-source priority indicator is used to indicate intra-source priorities of media streams corresponding to a same media source. The priority reference weight indicator is used to indicate a reference weight of the media source priority indicator and a reference weight of the media stream intra-source priority indicator.

The simulcast indicator is used to indicate that at least one of the N media sources supports simulcast.

The port multiplexing instruction is used to instruct to transmit, by using a same port address, media streams that have a same intra-source priority and corresponding to different media sources. It is found by means of testing that, that a media transmit end transmits, by using a same port address, media streams that have a same intra-source priority and corresponding to different media sources helps reduce port consumption caused by transmission of redundant code by using each port, and facilitates compatibility with a case in which an existing network side distinguishes between services according to port addresses.

402. The second media terminal sends, to the first media terminal, an SDP answer message m12 used for responding to the SDP offer message m11.

If the second media terminal supports simulcast, the SDP answer message m12 may include a confirmation indicator for the foregoing simulcast indicator. If the second media terminal supports port multiplexing, the SDP answer message m12 may include a confirmation indicator for the foregoing port multiplexing instruction.

The SDP answer message m12 may further include a confirmation indicator or an adjustment indicator for the foregoing priority indicator. In an example in this embodiment, the SDP answer message m12 includes the confirmation indicator for the foregoing priority indicator.

In addition, if the second media terminal does not support simulcast, the SDP answer message m12 may be replied according to a conventional SDP offer/answer mechanism. If the conferencing server re-initiates, when receiving an SDP answer message indicating that the second media terminal does not support simulcast, an SDP offer message to disable a simulcast mechanism, the conferencing server initiates a request by using a form in which one media source corresponds to only one media stream. This embodiment is described mainly by using a scenario in which the second media terminal supports simulcast as an example.

403. After a transmission path between the first media terminal and the second media terminal is established, the first media terminal sends, to the second media terminal by using the transmission path, media streams corresponding to N media sources.

It may be understood that a quantity of media streams corresponding to the N media sources is greater than N.

404. When the first media terminal detects that the transmission path between the first media terminal and the second media terminal is congested (for example, a delay occurs, and/or a packet loss rate exceeds a threshold), the first media terminal sends an SDP offer message m21 to the second media terminal, where the SDP offer message m21 may explicitly instruct to delete a media stream that is in a media source and that has a relatively low priority, or the SDP offer message m21 may explicitly instruct to delete some or all of media streams corresponding to a media source with a relatively low priority (because global priorities of the media streams are relatively low).

405. The second media terminal receives the SDP offer message m21 from the first media terminal, and sends an SDP answer message m22 to the first media terminal in response to the SDP offer message m21.

After receiving the SDP answer message m22 from the second media terminal, the first media terminal may identify a media stream with a relatively low priority and discard the media stream.

It may be learned that in the solution of this embodiment, the first media terminal used as a transmit end first determines the global priorities of the media streams corresponding to the N media sources, and when the transmission path between the first media terminal and the second media terminal is congested, the first media terminal may perform, based on the determined global priorities of the media streams corresponding to the N media sources, congestion control on the media streams corresponding to the N media sources that are sent by the first media terminal to the second media terminal. A relatively effective sending management and control mechanism is introduced to perform congestion control on media streams that include media streams to be simulcast that are to be sent by the transmit end, and a congestion control mechanism is determined with reference to the global priorities of the media streams corresponding to the N media sources. Therefore, this helps ensure, as far as possible in a case such as transmission path congestion, reliable transmission of media streams that have relatively high global priorities, further helps ensure quality of the media session, and further helps improve product experience of a user.

Figure 5:
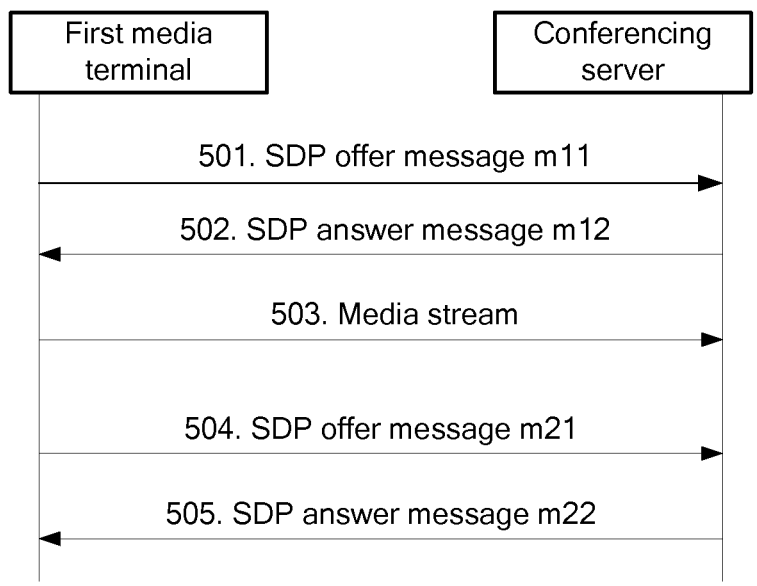
FIG. 5 is a schematic flowchart of another media session processing method according to an embodiment of the present invention.

Referring to FIG. 5, FIG. 5 is a schematic flowchart of another media session processing method according to another embodiment of the present invention. This embodiment is described by using an example for an application scenario in which a conferencing server participates, and a corresponding network architecture may be shown in FIG. 1-a or FIG. 1-c as an example.

As shown in FIG. 5, the another media session processing method provided in the another embodiment of the present invention may include the following steps.

501. A first media terminal sends an SDP offer message m11 to a conferencing server.

The SDP offer message m11 may be considered as a specific example of a session message (for example, a first session message or a second session message) mentioned in the foregoing embodiment.

The SDP offer message m11 may include a media description, a simulcast indicator, a port multiplexing instruction, a priority indicator, and/or the like.

The media description may be used to indicate N media sources, and the N media sources are N media sources that can be provided by the first media terminal in a media session in which the conferencing server participates. At least one of the N media sources separately corresponds to at least two media streams used to be simulcast in the media session.

In this embodiment, for example, N is an integer greater than 1.

For example, N may be equal to 352, 2, 3, 4, 5, 6, 8, 10, 15, 19, 21, 30, 500, or another value.

The priority indicator includes a media source priority indicator, a media stream intra-source priority indicator, and a priority reference weight indicator, and the priority indicator is used to determine global priorities of media streams corresponding to the N media sources.

The media source priority indicator is used to indicate priorities of the N media sources. The media stream intra-source priority indicator is used to indicate intra-source priorities of media streams corresponding to a same media source. The priority reference weight indicator is used to indicate a reference weight of the media source priority indicator and a reference weight of the media stream intra-source priority indicator.

The simulcast indicator is used to indicate that at least one of the N media sources supports simulcast.

The port multiplexing instruction is used to instruct to transmit, by using a same port address, media streams that have a same intra-source priority and corresponding to different media sources. It is found by means of testing that, that a media transmit end transmits, by using a same port address, media streams that have a same intra-source priority and corresponding to different media sources helps reduce port consumption caused by transmission of redundant code by using each port, and facilitates compatibility with a case in which an existing network side distinguishes between services according to port addresses.

502. The conferencing server sends, to the first media terminal, an SDP answer message m12 used for responding to the SDP offer message m11.

If the conferencing server supports simulcast, the SDP answer message m12 may include a confirmation indicator for the foregoing simulcast indicator. If the conferencing server supports port multiplexing, the SDP answer message m12 may include a confirmation indicator for the foregoing port multiplexing instruction.

The SDP answer message m12 may further include a confirmation indicator or an adjustment indicator for the foregoing priority indicator. In an example in this embodiment, the SDP answer message m12 includes the confirmation indicator for the foregoing priority indicator.

In addition, if the conferencing server does not support simulcast, the SDP answer message m12 may be replied according to a conventional SDP offer/answer mechanism. If the first media terminal receives an SDP answer message indicating that the conferencing server does not support simulcast, the first media terminal re-initiates an SDP offer message to disable a simulcast mechanism, and initiates a request by using a form in which one media source corresponds to only one media stream. This embodiment is described mainly by using a scenario in which the conferencing server supports simulcast as an example.

503. After a transmission path between the first media terminal and the conferencing server is established, the first media terminal sends, by using the transmission path to the conferencing server, media streams corresponding to N media sources.

It may be understood that a quantity of media streams corresponding to the N media sources is greater than N.

504. When the first media terminal detects that the transmission path between the first media terminal and the conferencing server is congested (for example, a delay occurs, and/or a packet loss rate exceeds a threshold), the first media terminal sends an SDP offer message m21 to the conferencing server, where the SDP offer message m21 may explicitly instruct to delete a media stream that is in a media source and that has a relatively low priority, or the SDP offer message m21 may explicitly instruct to delete some or all of media streams corresponding to a media source with a relatively low priority (because global priorities of the media streams are relatively low).

505. After receiving the SDP offer message m21 from the first media terminal, the conferencing server sends an SDP answer message m22 to the first media terminal in response to the SDP offer message m21.

After receiving the SDP answer message m22 from the conferencing server, the first media terminal may identify a media stream with a relatively low priority and discard the media stream.

It may be learned that in the technical solution of this embodiment, the first media terminal used as a transmit end first determines the global priorities of the media streams corresponding to the N media sources, and when the transmission path between the first media terminal and the conferencing server is congested, the first media terminal may perform, based on the determined global priorities of the media streams corresponding to the N media sources, congestion control on the media streams corresponding to the N media sources that are sent by the first media terminal to the conferencing server. A relatively effective sending management and control mechanism is introduced to perform congestion control on media streams that include media streams to be simulcast that are to be sent by the transmit end, and a congestion control mechanism is determined with reference to the global priorities of the media streams corresponding to the N media sources. Therefore, this helps ensure, as far as possible in a case such as transmission path congestion, reliable transmission of media streams that have relatively high global priorities, further helps ensure quality of the media session, and further helps improve product experience of a user.

Figure 6:
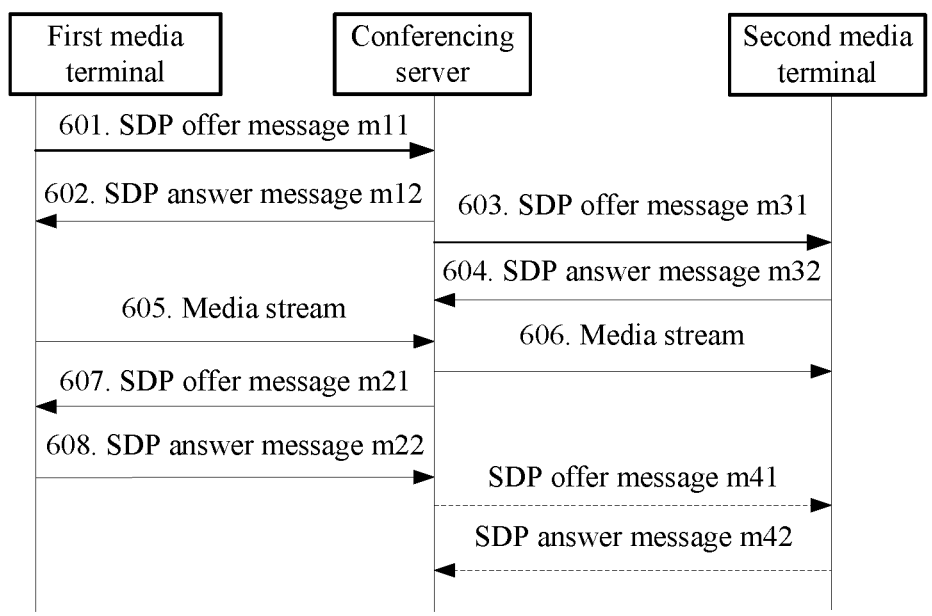
FIG. 6 is a schematic flowchart of another media session processing method according to an embodiment of the present invention.

Referring to FIG. 6, FIG. 6 is a schematic flowchart of another media session processing method according to another embodiment of the present invention. This embodiment is described by using an example for an application scenario in which a conferencing server participates, and a corresponding network architecture may be shown in FIG. 1-*a* or FIG. 1-*c*.

As shown in FIG. 6, the another media session processing method provided in the another embodiment of the present invention may include the following steps.

601. A first media terminal sends an SDP offer message m11 to a conferencing server.

The SDP offer message m11 may be considered as a specific example of a session message (for example, a first session message or a second session message) mentioned in the foregoing embodiment.

The SDP offer message m11 may include a media description, a simulcast indicator, a port multiplexing instruction, a priority indicator, and/or the like.

The media description may be used to indicate N media sources, and the N media sources are N media sources that can be provided by the first media terminal in a media session in which the conferencing server participates. At least one of the N media sources separately corresponds to at least two media streams used to be simulcast in the media session.

In this embodiment, for example, N is an integer greater than 1.

For example, N may be equal to 352, 2, 3, 4, 5, 6, 8, 10, 15, 19, 21, 30, 500, or another value.

The priority indicator includes a media source priority indicator, a media stream intra-source priority indicator, and a priority reference weight indicator, and the priority indicator is used to determine global priorities of media streams corresponding to the N media sources.

The simulcast indicator is used to indicate that at least one of the N media sources supports simulcast.

The port multiplexing instruction is used to instruct to transmit, by using a same port address, media streams that have a same intra-source priority and corresponding to different media sources. It is found by means of testing that, that a media transmit end transmits, by using a same port address, media streams that have a same intra-source priority and corresponding to different media sources helps reduce port consumption caused by transmission of redundant code by using each port, and facilitates compatibility with a case that an existing network side distinguishes between services according to port addresses.

602. The conferencing server sends, to the first media terminal, an SDP answer message m12 used for responding to the SDP offer message m11.

If the conferencing server supports simulcast, the SDP answer message m12 may include a confirmation indicator for the foregoing simulcast indicator. If the conferencing server supports port multiplexing, the SDP answer message m12 may include a confirmation indicator for the foregoing port multiplexing instruction.

The SDP answer message m12 may further include a confirmation indicator or an adjustment indicator for the foregoing priority indicator. In an example in this embodiment, the SDP answer message m12 includes the confirmation indicator for the foregoing priority indicator.

In addition, if the conferencing server does not support simulcast, the SDP answer message m12 may be replied according to a conventional SDP offer/answer mechanism. If the first media terminal receives an SDP answer message indicating that the conferencing server does not support simulcast, the first media terminal re-initiates an SDP offer message to disable a simulcast mechanism, and initiates a request by using a form in which one media source corresponds to only one media stream. This embodiment is described mainly by using a scenario in which the conferencing server supports simulcast as an example.

603. The conferencing server sends an SDP offer message m31 to a second media terminal.

The SDP offer message m31 may be considered as a specific example of a session message (for example, a first session message or a second session message) mentioned in the foregoing embodiment.

The SDP offer message m31 may include a media description, a simulcast indicator, a port multiplexing instruction, a priority indicator, and/or the like.

The media description may be used to indicate N media sources, and the N media sources are N media sources that can be provided by the first media terminal in the media session in which the conferencing server participates. At least one of the N media sources separately corresponds to at least two media streams used to be simulcast in the media session.

The priority indicator includes a media source priority indicator, a media stream intra-source priority indicator, and a priority reference weight indicator, and the priority indicator is used to determine global priorities of media streams corresponding to the N media sources.

The simulcast indicator is used to indicate that at least one of the N media sources supports simulcast.

The port multiplexing instruction is used to instruct to transmit, by using a same port address, media streams that have a same intra-source priority and corresponding to different media sources.

604. The second media terminal sends, to the conferencing server, an SDP answer message m32 used for responding to the SDP offer message m31.

If the second media terminal supports simulcast, the SDP answer message m32 may include a confirmation indicator for the foregoing simulcast indicator. If the conferencing server supports port multiplexing, the SDP answer message m32 may include a confirmation indicator for the foregoing port multiplexing instruction.

The SDP answer message m32 may further include a confirmation indicator or an adjustment indicator for the foregoing priority indicator. In this embodiment, for example, the SDP answer message m32 includes the confirmation indicator for the foregoing priority indicator.

In addition, if the second media terminal does not support simulcast, the SDP answer message m32 may be replied according to a conventional SDP offer/answer mechanism. If the conferencing server re-initiates, when receiving an SDP answer message indicating that the second media terminal does not support simulcast, an SDP offer message to disable a simulcast mechanism, the conferencing server initiates a request by using a form in which one media source corresponds to only one media stream. This embodiment is described mainly by using a scenario in which the second media terminal supports simulcast as an example.

It may be understood that there is no necessary order between steps 601 to 602 and steps 603 to 604. Steps 603 to 604 may be performed before steps 601 to 602, or steps 603 to 604 may be performed after steps 601 to 602, or steps 603 to 604 and steps 601 to 602 may be performed synchronously.

605. After a transmission path between the first media terminal and the conferencing server is established, the first media terminal sends, to the conferencing server by using the transmission path, media streams corresponding to the N media sources.

It may be understood that a quantity of media streams corresponding to the N media sources is greater than N.

It may be understood that there is no necessary order between steps 603 to 604 and step 605. Step 605 may be performed before steps 603 to 604, or step 605 may be performed after steps 603 to 604, or steps 603 to 604 and step 605 may be performed synchronously.

606. After a transmission path between the second media terminal and the conferencing server is established, the conferencing server sends, to the second media terminal by using the transmission path, the media streams corresponding to the N media sources.

607. When the conferencing server detects that the transmission path between the first media terminal and the conferencing server is congested (for example, a delay occurs, and/or a packet loss rate exceeds a threshold), the conferencing server sends an SDP offer message m21 to the first media terminal, where the SDP offer message m21 may explicitly instruct to delete a media stream that is in a media source and that has a relatively low priority, or the SDP offer message m21 may explicitly instruct to delete some or all of media streams corresponding to a media source with a relatively low priority (because global priorities of the media streams are relatively low).

608. After receiving the SDP offer message m21 from the conferencing server, the first media terminal sends an SDP answer message m22 to the conferencing server in response to the SDP offer message m21.

It may be understood that, similar to steps 607 and 608, in some possible application scenarios, when the conferencing server detects that the transmission path between the second media terminal and the conferencing server is congested (for example, a delay occurs, and/or a packet loss rate exceeds a threshold), the conferencing server sends an SDP offer message m41 to the second media terminal. The SDP offer message m41 may explicitly instruct to delete a media stream that is in a media source and that has a relatively low priority, or the SDP offer message m41 may explicitly instruct to delete some or all of media streams corresponding to a media source with a relatively low priority (because global priorities of the media streams are relatively low). After receiving the SDP offer message m41 from the conferencing server, the second media terminal sends an SDP answer message m42 to the conferencing server in response to the SDP offer message m41.

It may be understood that an event that the transmission path between the second media terminal and the conferencing server is congested and an event that the transmission path between the first media terminal and the conferencing server is congested may both occur in a period, or certainly may not occur at the same time. When a transmission path between the conferencing server and a media terminal is congested, the conferencing server may send an SDP offer message to the media terminal to instruct to delete a media stream that is in a media source and that has a relatively low priority, or instruct to delete some or all of media streams corresponding to a media source with a relatively low priority.

It may be learned that in the technical solution of this embodiment, the first media terminal used as a transmit end first determines the global priorities of the media streams corresponding to the N media sources, and when it is determined that the transmission path between the first media terminal and the conferencing server is congested, the first media terminal may perform, based on the determined global priorities of the media streams corresponding to the N media sources, congestion control on the media streams corresponding to the N media sources that are sent by the first media terminal to the conferencing server. A relatively effective sending management and control mechanism is introduced to perform congestion control on media streams that include media streams to be simulcast that are to be sent by the transmit end, and a congestion control mechanism is determined with reference to the global priorities of the media streams corresponding to the N media sources. Therefore, this helps ensure, as far as possible in a case such as transmission path congestion, reliable transmission of media streams that have relatively high global priorities, helps ensure quality of the media session, and further helps improve product experience of a user.

To help better understand how global priorities of media streams corresponding to N media sources are determined jointly based on priorities (which may be indicated by a media source priority indicator) of the N media sources, intra-source priorities (which may be indicated by a media stream intra-source priority indicator) of media streams corresponding to each of the N media sources, and priority reference weights (which may be indicated by a priority reference weight indicator), descriptions are provided below with reference to the accompanying drawings FIG. 7-*a* to FIG. 7-*e*.

As shown in FIG. 7-*a* as an example, it is assumed that N media sources include a media source M1, a media source M2, a media source M3, and a media source Mx. The media source M1, the media source M2, the media source M3, and the media source Mx each are encoded into three media streams.

The media source M1 is encoded into a media stream M11, a media stream M12, and a media stream M13.

The media source M2 is encoded into a media stream M21, a media stream M22, and a media stream M23.

The media source M3 is encoded into a media stream M31, a media stream M32, and a media stream M33.

The media source Mx is encoded into a media stream Mx1, a media stream Mx2, and a media stream Mx3.

FIG. 7-*a* shows high-to-low order of intra-source priorities of different media streams corresponding to a same media source as an example.

High-to-low order, shown in FIG. 7-*a* as an example, of intra-source priorities of the three media streams corresponding to M1 is M11>M12>M13. High-to-low order, shown in FIG. 7-*a* as an example, of intra-source priorities of the three media streams corresponding to M2 as an example is M21>M22>M23. High-to-low order, shown in FIG. 7-*a* as an example, of intra-source priorities of the three media streams corresponding to M3 is M31>M32>M33. High-to-low order of intra-source priorities, shown in FIG. 7-*a* as an example, of the three media streams corresponding to the Mx is Mx1>Mx2>Mx3.

FIG. 7-*b* shows, as an example, priorities of the media source M1, the media source M2, the media source M3, and the media source Mx included in the N media sources. High-to-low order, shown in FIG. 7-*b* as an example, of the priorities of the N media sources is M1>M2>M3>Mx. Specifically, assuming that the media source M1 is audio, and the media sources M2/M3/Mx are videos, when a network is congested, transmission of the media source M1, that is, the audio, usually needs to be preferentially ensured. Therefore, a priority of the media source M1 is the highest. For the media sources M2/M3/Mx, a transmit end may set priorities of different media sources of a same media type according to an actual policy. For example, a priority of a media source representing a sub-stream image is higher than a priority of a media source representing a conference site figure image.

If the priority reference weights indicate that a reference weight of the priorities of the N media sources is lower than a reference weight of the intra-source priorities of the media streams corresponding to each of the N media sources, that is, integrity of the media sources is preferentially ensured, as shown in FIG. 7-*c* as an example, a packet is discarded according to priority order indicated by arrows in FIG. 7-*c*. Three media streams Mx3, M33, and M23 may be discarded. In this way, although the three media streams are discarded, the media sources M1/M2/M3/Mx each have a corresponding to-be-sent media stream, that is, this packet discarding policy is equivalent to a rule of tending to ensure integrity of the media sources for sending. Order of global priorities of overall media streams is indicated by the arrows in FIG. 7-*c*. If a network is congested and a packet discarding policy needs to be executed, packets may be sequentially discarded according to the order indicated by the arrows.

If the priority reference weights indicate that a reference weight of the priorities of the N media sources is higher than a reference weight of the intra-source priorities of the media streams corresponding to each of the N media sources, that is, sending of as many media streams of a media source having a high priority as possible is preferentially ensured, as shown in FIG. 7-*d* as an example, a packet is discarded according to priority order indicated by arrows in FIG. 7-*d*. Three media streams Mx3, Mx2, and Mx1 may be discarded. In this way, although the three media streams are discarded, and consequently, the media source Mx is not sent, multiple media streams of the media sources M1/M2/M3 may be sent. Order of global priorities of overall media streams is indicated by the arrows in FIG. 7-*d*. If a network is congested and a packet discarding policy needs to be executed, packets may be sequentially discarded according to the order indicated by the arrows.

FIG. 7-*e* shows a case in which only one of the N media sources corresponds to multiple media streams, and the other media sources are each corresponding to only one media stream. Possible order of global priorities of overall media streams is indicated by arrows in FIG. 7-*e*. If a network is congested and a packet discarding policy needs to be executed, packets may be sequentially discarded according to the order indicated by the arrows.

In addition, for port consumption reduction, the media streams M11/M21/M31/Mx1 that have high priorities and corresponding to the media sources M1/M2/M3/Mx may be transmitted by using a port address 1, the media streams M12/M22/M32/Mx2 that have intermediate priorities and corresponding to the media sources M1/M2/M3/Mx may be transmitted by using a port address 2, and the media streams M13/M23/M33/Mx3 that have low priorities and corresponding to the media sources M1/M2/M3/Mx may be transmitted by using a port address 3. Therefore, a media transmit end adds a port multiplexing instruction to a session request message, and the port multiplexing instruction is used to instruct to transmit, by using a same port address, media streams that have a same intra-source priority and corresponding to different media sources. It is found by means of testing that, that a media transmit end transmits, by using a same port address, media streams that have a same intra-source priority and corresponding to different media sources helps reduce port consumption caused by transmission of redundant code by using each port, and facilitates compatibility with a case in which an existing network side distinguishes between services according to port addresses.

The following provides, with reference to the examples shown in FIG. 7-a to FIG. 7-e, examples for some possible forms of a media description, a port multiplexing instruction, a priority indicator, and the like in an SDP offer message.

The media description in the SDP offer message may indicate a binding relationship between a same media source and multiple corresponding media streams, for example, in the following manner:

adding a group that supports simulcast, where a=group: Simulcast <mid> indicates the binding relationship, and the group may be specifically, for example:

a=group: Simulcast M11 M12 M13, //indicating that media streams M11/M12/M13 all come from a same media source M1;

a=group: Simulcast M21 M22 M23//indicating that media streams M21/M22/M23 all come from a same media source M2;

a=group: Simulcast M31 M32 M33//indicating that media streams M31/M32/M33 all come from a same media source M3; and a=group: Simulcast Mx1 Mx2 Mx3//indicating that media streams Mx1/Mx2/Mx3 all come from a same media source Mx.

The priority indicator in the SDP offer message may indicate priorities of different media sources, specifically for example, in the following manner:

adding a=pri-source: Name of Group <order>, to indicate order of priorities of different media sources to which the simulcast belongs.

A possible value of the order herein is, for example, ascending/descending/equal.

a=pri-source: Simulcast descending//which may indicate that different media sources to which simulcast groups belong are arranged in descending order of priorities, and M1>M2>M3>Mx.

That is, [M11, M12, M13]>[M21, M22, M23]>[M31, M32, M33]>[Mx1, Mx2, Mx3].

The priority indicator in the SDP offer message may indicate intra-source priorities of different media streams in a same media source, specifically for example, in the following manner:

adding a=pri-stream: Name of Group <order>, to indicate order of intra-source priority of media streams in a same media source.

A possible value of the order herein is ascending/descending/equal.

a=pri-stream: Simulcast descending//indicating that media streams in a simulcast group are arranged in descending order of priorities;

a=group: Simulcast M11 M12 M13//indicating that M11/M12/M13 all come from M1, and order of priorities is M11>M12>M13;

a=group: Simulcast M21 M22 M23//indicating that M21/M22/M23 all come from M2, and order of priorities is M21>M22>M23;

a=group: Simulcast M31 M32 M33//indicating that M31/M32/M33 all come from M3, and order of priorities is M31>M32>M33;

a=group: Simulcast Mx1 Mx2 Mx3//indicating that Mx1/Mx2/Mx3 all come from Mx, and order of priorities is Mx1>Mx2>Mx3.

According to the foregoing steps, an intra-source priority relationship of media streams and a priority relationship of media sources are already indicated at a session negotiation level, and a global priority relationship of all media streams is indicated. Further, an SDP/RTP header may be extended in the following manner, so that specific media streams form priority parameter mapping between the SDP and the RTP/RTCP.

Descriptions are provided below by using the media stream M11 as an example. An a-line attribute a=pri of a media level is added to the SDP, to instruct to add a priority of the media stream level to a header extension of a corresponding Real-time Transport Protocol (RTP) packet, and the a-line attribute may be expressed as follows:

m=video RTP PORT1 YYYY
a=mid M11
a=pri:p1
a=rtpmap:0 PCMU/8000
a=extmap 21 urn:ietf:params:rtp-hdrext:sdes:pri.

A header extension of a matched RTP packet may be shown in FIG. 7-f as an example.

A header extension of a matched RTCP packet may be shown in FIG. 7-g as an example, and an SDES item is mainly added.

In addition, media streams that have a same intra-source priority and corresponding to different media sources are transmitted by using a same RTP port address, to reduce port consumption. The following instruction manner may be used for the port multiplexing instruction: multiplexing multiple media streams at one port by using a bundle mechanism, for example, a multiplexing situation of an RTP port 1 is as follows:

a=group: Bundle M11 M21 M31 Mx1//indicating that M11/M21/M31/Mx1 are multiplexed at a same RTP port, that is, a port 1.

m=video RTP PORT1 YYYY
a=mid M11//indicating that M11 is transmitted at the port 1
m=video RTP PORT1 YYYY
a=mid M21//indicating that M21 is transmitted at the port 1
m=video RTP PORT1 YYYY
a=mid M31//indicating that M31 is transmitted at the port 1
m=video RTP PORT1 YYYY
a=mid Mx1//indicating that Mx1 is transmitted at the port 1 a=group: Bundle M12 M22 M32 Mx2//indicating that M12/M22/M32/Mx2 are multiplexed at a same RTP port, that is, a port 2 m=video RTP PORT2 YYYY
a=mid M12//indicating that M12 is transmitted at the port 2
m=video RTP PORT2 YYYY
a=mid M22//indicating that M22 is transmitted at the port 2
m=video RTP PORT2 YYYY a=mid M32//indicating that M32 is transmitted at the port 2
m=video RTP PORT2 YYYY
a=mid Mx2//indicating that Mx2 is transmitted at the port 2
a=group: Bundle M13 M23 M33 Mx3//indicating that M13/M23/M33/Mx3 are multiplexed at a same RTP port, that is, a port 3
m=video RTP PORT3 YYYY
a=mid M13//indicating that M13 is transmitted at the port 3
m=video RTP PORT3 YYYY
a=mid M23//indicating that M23 is transmitted at the port 3
m=video RTP PORT3 YYYY
a=mid M33//indicating that M33 is transmitted at the port 3
m=video RTP PORT3 YYYY
a=mid Mx3//indicating that Mx3 is transmitted at the port 3
where
a=group: Bundle M11 M21 M31 Mx1//indicating that M11/M21/M31/Mx1 are multiplexed at the port 1;
a=group: Bundle M12 M22 M32 Mx2//indicating that M12/M22/M32/Mx2 are multiplexed at the port 2;
a=group: Bundle M13 M23 M33 Mx3//indicating that M13/M23/M33/Mx3 are multiplexed at the port 3.

Possible forms of the media description, the port multiplexing instruction, the priority indicator, and the like in the SDP offer message in the foregoing examples are merely for descriptions. In actual application, a specific expression form may be adjusted as required.

Figure 8:
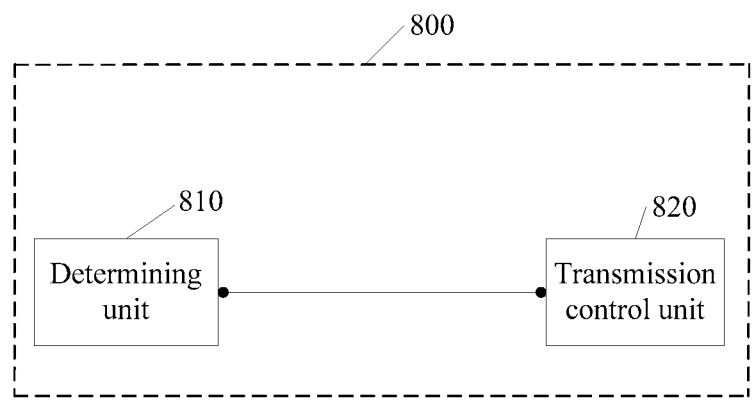
FIG. 8 is a schematic diagram of another media device according to an embodiment of the present invention.

Referring to FIG. 8, an embodiment of the present invention further provides another media device 800 that may include a determining unit 810 and a transmission control unit 820.

The determining unit 810 is configured to determine global priorities of media streams corresponding to N media sources, where N is a positive integer, the N media sources are N media sources that can be provided by the media device in a media session in which a second media device participates, and one of the N media sources corresponds to at least two media streams used to be simulcast in the media session.

The transmission control unit 820 is configured to: when a transmission path between the media device 800 and the second media device is congested, perform, based on the determined global priorities of the media streams corresponding to the N media sources, congestion control on the media streams corresponding to the N media sources that are sent by the media device 800 to the second media device.

In some possible implementations of the present invention, the global priorities of the media streams corresponding to the N media sources may be determined jointly based on priorities of the N media sources, intra-source priorities of media streams corresponding to each of the N media sources, and priority reference weights, and the priority reference weights are a reference weight of the priorities of the N media sources and a reference weight of the intra-source priorities of the media streams corresponding to each of the N media sources.

In some possible implementations of the present invention, the global priorities of the media streams corresponding to the N media sources are determined jointly based on priorities of the N media sources, and intra-source priorities of media streams corresponding to each of the N media sources.

In some possible implementations of the present invention, the determining unit is configured to determine, by negotiating with the second media device, the global priorities of the media streams corresponding to the N media sources.

In some possible implementations of the present invention, the determining unit 810 may be configured to: determine, according to a user priority setting instruction, the global priorities of the media streams corresponding to the N media sources; or determine, according to a preconfigured priority determining policy, the global priorities of the media streams corresponding to the N media sources.

In some possible implementations of the present invention, the determining unit 810 may be configured to: send a first session message to the second media device, where the first session message includes a priority indicator, and the priority indicator is used to determine global priorities of the media streams corresponding to the N media sources; and receive a first session answer message sent by the second media device, where if the first session answer message includes a confirmation indicator for the priority indicator, the global priorities, determined according to the priority indicator, of the media streams corresponding to the N media sources are the global priorities, determined by the determining unit, of the media streams corresponding to the N media sources; or the determining unit 810 may be configured to: send a second session message to the second media device, where the second session message includes a priority indicator, and the priority indicator is used to determine global priorities of the media streams corresponding to the N media sources; receive a second session answer message sent by the second media device; and if the second session answer message includes an adjustment indicator for the priority indicator, adjust, based on the adjustment indicator, the global priorities that are of the media streams corresponding to the N media sources that are indicated by the priority indicator, where the adjusted global priorities of the media streams corresponding to the N media sources are the global priorities, determined by the determining unit, of the media streams corresponding to the N media sources; or the determining unit 810 may be configured to: receive a third session message sent by the second media device, where the third session message includes a priority indicator, and the priority indicator is used to determine global priorities of the media streams corresponding to the N media sources; send a third session answer message to the second media device, where the third session answer message includes a confirmation indicator for the priority indicator; and determine, based on the priority indicator in the third session message, the global priorities of the media streams corresponding to the N media sources; or the determining unit 810 may be configured to: receive a fourth session message sent by the second media device, where the fourth session message includes a priority indicator, and the priority indicator is used to determine global priorities of the media streams corresponding to the N media sources; and send a fourth session answer message to the second media device, where the fourth session answer message includes an adjustment indicator for the priority indicator, and global priorities, adjusted based on the adjustment indicator, of the media streams corresponding to the N media sources are the global priorities, determined by the determining unit 810, of the media streams corresponding to the N media sources.

In some possible implementations of the present invention, the first session message, the second session message, the first session answer message, or the second session answer message further includes a port multiplexing instruction, and the port multiplexing instruction is used to instruct to transmit, by using a same port address, media streams that have a same intra-source priority and corresponding to different media sources.

In some possible implementations of the present invention, the third session message, the fourth session message, the third session answer message, or the fourth session answer message further includes a port multiplexing instruction, and the port multiplexing instruction is used to instruct to transmit, by using a same port address, media streams that have a same intra-source priority and corresponding to different media sources.

In some possible implementations of the present invention, when N is equal to 1, the priority indicator includes a media stream intra-source priority indicator, and the media stream intra-source priority indicator is used to indicate intra-source priorities of media streams corresponding to a media source.

In some possible implementations of the present invention, when N is greater than 1, the priority indicator includes a media source priority indicator, a media stream intra-source priority indicator, and a priority reference weight indicator. The media source priority indicator is used to indicate priorities of different media sources. The media stream intra-source priority indicator is used to indicate intra-source priorities of media streams corresponding to a same media source. The priority reference weight indicator is used to indicate a reference weight of the media source priority indicator and a reference weight of the media stream intra-source priority indicator.

In some possible implementations of the present invention, when the priority reference weight indicator is used to indicate that the reference weight of the media source priority indicator is higher than the reference weight of the media stream intra-source priority indicator, if a priority of a media source i in the N media sources is higher than a priority of a media source j in the N media sources, a global priority of any media stream corresponding to the media source i is higher than a global priority of any media stream corresponding to the media source j, where the media source i and the media source j are any two media sources in the N media sources.

In some possible implementations of the present invention, when the priority reference weight indicator is used to indicate that the reference weight of the media source priority indicator is lower than the reference weight of the media stream intra-source priority indicator, if a priority of a media source i in the N media sources is higher than a priority of a media source j in the N media sources, and an intra-source priority of a media stream ix corresponding to the media source i is equal to an intra-source priority of a media stream jx corresponding to the media source j, a global priority of the media stream ix is higher than a global priority of the media stream jx, where the media source i and the media source j are any two media sources in the N media sources, the media stream ix corresponding to the media source i is any media stream corresponding to the media source i, and the media stream jx corresponding to the media source j is any media stream corresponding to the media source j; or if a priority of a media source i in the N media sources is higher than a priority of a media source j in the N media sources, an intra-source priority of a media stream ix corresponding to the media source i is equal to an intra-source priority of a media stream jx corresponding to the media source j, and the intra-source priority of the media stream ix is higher than an intra-source priority of a media stream iy in the media source i, a global priority of the media stream jx is higher than a global priority of the media stream iy, where the media source i and the media source j are any two media sources in the N media sources, the media stream ix and the media stream iy are any two media streams corresponding to the media source i, and the media stream jx corresponding to the media source j is any media stream corresponding to the media source j; or if a priority of a media source i in the N media sources is higher than a priority of a media source j in the N media sources, an intra-source priority of a media stream ix corresponding to the media source i is equal to an intra-source priority of a media stream jx corresponding to the media source j, and the intra-source priority of the media stream ix is lower than an intra-source priority of a media stream iw in the media source i, a global priority of the media stream jx is lower than a global priority of the media stream iw, where the media source i and the media source j are any two media sources in the N media sources, the media stream ix and the media stream iw are any two media streams corresponding to the media source i, and the media stream jx corresponding to the media source j is any media stream corresponding to the media source j.

In some possible implementations of the present invention, the transmission control unit 820 may be configured to: when the transmission path between the media device and the second media device is congested, discard some or all of media data packets of media streams, having relatively low global priorities, in the media streams corresponding to the N media sources that are to be sent by the media device to the second media device; or when the transmission path between the media device and the second media device is congested, delay sending of some or all of media data packets of media streams, having relatively low global priorities, in the media streams corresponding to the N media sources that are to be sent by the media device to the second media device.

In some possible implementations of the present invention, when the media device 800 is a conferencing server, the second media device may be a media terminal; or when the media device 800 is a media terminal, the second media device may be a media terminal or a conferencing server.

It may be understood that functions of function modules of the media device 800 in this embodiment and a mechanism of interaction between the media device and another device may be implemented according to the method in the method embodiments. For a specific implementation process thereof, refer to related descriptions of the method embodiments. Details are not repeated herein.

It may be understood that in the technical solution of this embodiment, the media device 800 used as a transmit end may first determine the global priorities of the media streams corresponding to the N media sources, and when the transmission path between the media device 800 and the second media device is congested, the media device 800 may perform, based on the determined global priorities of the media streams corresponding to the N media sources, congestion control on the media streams corresponding to the N media sources that are sent by the media device 800 to the second media device. A relatively effective sending management and control mechanism is introduced to perform congestion control on media streams that include media streams to be simulcast that are to be sent by the transmit end, and a congestion control mechanism is determined with reference to the global priorities of the media streams corresponding to the N media sources. Therefore, this helps ensure, as far as possible in a case such as transmission path congestion, reliable transmission of media streams that have relatively high global priorities, further helps ensure quality of the media session, and further helps improve product experience of a user.

Figure 9:
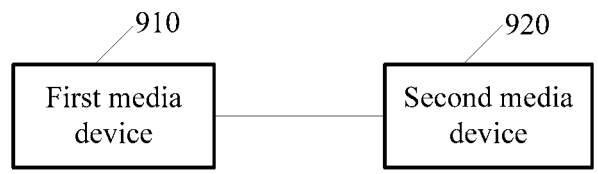
FIG. 9 is a schematic diagram of a communications system according to an embodiment of the present invention.

Referring to FIG. 9, an embodiment of the present invention further provides a communications system, including:

a first media device 910 and a second media device 920, where the first media device 910 may be any media device according to the foregoing embodiments. For example, the first media device 910 may be the media device 200 or the media device 800.

In some embodiments, in some possible implementations of the present invention, when the first media device 910 is a conferencing server, the second media device may be a media terminal; or when the first media device 910 is a media terminal, the second media device may be a media terminal or conferencing server.

It should be noted that, to make the description brief, the foregoing method embodiments are expressed as a series of actions. However, persons skilled in the art should understand that the present invention is not limited to the described action order, because according to the present invention, some steps may be performed in other order or performed simultaneously. In addition, persons skilled in the art should also understand that all the embodiments described in the specification are preferred embodiments, and the related actions and modules are not necessarily required by the present invention.

In the foregoing embodiments, the description of each embodiment has respective focuses. For a part that is not described in detail in an embodiment, refer to related descriptions in other embodiments.

In the embodiments provided in this application, it should be understood that the disclosed apparatus may be implemented in other manners. For example, the described apparatus embodiments are merely an example. For example, the unit division is merely logical function division and may be another division manner in actual implementation. For example, multiple units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic or other forms.

The units described as separate parts may or may not be physically separate, and parts displayed as units may or may not be physical units, may be located in one position, or may be distributed on multiple network units. Some or all of the units may be selected according to actual requirements to achieve the objectives of the solutions in the embodiments.

In addition, functional units in the embodiments of the present invention may be integrated into one processing unit, or each of the units may exist alone physically, or two or more units are integrated into one unit. The integrated unit may be implemented in a form of hardware, or may be implemented in a form of a software functional unit.

When the integrated unit is implemented in the form of a software functional unit and sold or used as an independent product, the integrated unit may be stored in a computer-readable storage medium. Based on such an understanding, the technical solutions of the present invention essentially, or the part contributing to the prior art, or all or a part of the technical solutions may be implemented in the form of a software product. The software product is stored in a storage medium and includes several instructions for instructing a computer device (which may be a personal computer, a server, or a network device) to perform all or a part of the steps of the methods described in the embodiments of the present invention. The foregoing storage medium includes: any medium that can store program code, such as a USB flash drive, a read-only memory (ROM), a random access memory (RAM), a removable hard disk, a magnetic disk, or an optical disc.

The foregoing embodiments are merely intended for describing the technical solutions of the present invention, but not for limiting the present invention. Although the present invention is described in detail with reference to the foregoing embodiments, persons of ordinary skill in the art should understand that they may still make modifications to the technical solutions described in the foregoing embodiments or make equivalent replacements to some technical features thereof, without departing from the scope of the technical solutions in the embodiments of the present invention.

What is claimed is:

1. A media session processing method, comprising:
    determining, by a first media device, global priorities of media streams corresponding to N media sources, wherein N is a positive integer, the N media sources are N media sources provided by the first media device in a media session in which a second media device participates, and one of the N media sources corresponds to at least two media streams simulcast in the media session, wherein the global priorities of the media streams corresponding to the N media sources are determined jointly based on priorities of the N media sources, and intra-source priorities of media streams corresponding to each of the N media sources; and
    when a transmission path between the first media device and the second media device is congested, performing, by the first media device based on the determined global priorities of the media streams corresponding to the N media sources, congestion control on the media streams corresponding to the N media sources sent by the first media device to the second media device.

2. The method according to claim 1, wherein
    the global priorities of the media streams corresponding to the N media sources are further determined jointly based on priority reference weights, wherein the priority reference weights are a reference weight of the priorities of the N media sources and a reference weight of the intra-source priorities of the media streams corresponding to each of the N media sources.

3. The method according to claim 1, wherein the determining, by a first media device, global priorities of media streams corresponding to N media sources comprises:
    determining, by the first media device according to a user priority setting instruction, the global priorities of the media streams corresponding to the N media sources; or determining, by the first media device according to a preconfigured priority determining policy, the global priorities of the media streams corresponding to the N media sources.

4. The method according to claim 1, wherein determining, by a first media device, global priorities of media streams corresponding to N media sources comprises: determining, by the first media device, by negotiating with the second media device, the global priorities of the media streams corresponding to the N media sources.

5. The method according to claim 4, wherein
determining, by the first media device, by negotiating with the second media device, the global priorities of the media streams corresponding to the N media sources comprises:
sending, by the first media device, a first session message to the second media device, wherein the first session message includes a priority indicator, and the priority indicator is used to determine global priorities of the media streams corresponding to the N media sources; and receiving, by the first media device, a first session answer message sent by the second media device, wherein if the first session answer message includes a confirmation indicator for the priority indicator, the global priorities, determined according to the priority indicator, of the media streams corresponding to the N media sources are the global priorities, determined by the first media device, of the media streams corresponding to the N media sources; or
sending, by the first media device, a second session message to the second media device, wherein the second session message includes a priority indicator, and the priority indicator is used to indicate global priorities of the media streams corresponding to the N media sources; receiving, by the first media device, a second session answer message sent by the second media device; and if the second session answer message includes an adjustment indicator for the priority indicator, adjusting, based on the adjustment indicator, the global priorities that are of the media streams corresponding to the N media sources that are indicated by the priority indicator, wherein the adjusted global priorities of the media streams corresponding to the N media sources are the global priorities, determined by the first media device, of the media streams corresponding to the N media sources.

6. The method according to claim 5, wherein
the first session message, the second session message, the first session answer message, or the second session answer message further includes a port multiplexing instruction, wherein the port multiplexing instruction is used to instruct to transmit, by using a same port address, media streams that have a same intra-source priority and corresponding to different media sources.

7. The method according to claim 4, wherein
determining, by the first media device, by negotiating with the second media device, the global priorities of the media streams corresponding to the N media sources comprises:
receiving, by the first media device, a third session message sent by the second media device, wherein the third session message includes a priority indicator, and the priority indicator is used to determine global priorities of the media streams corresponding to the N media sources; sending, by the first media device, a third session answer message to the second media device, wherein the third session answer message includes a confirmation indicator for the priority indicator; and determining, by the first media device based on the priority indicator in the third session message, the global priorities of the media streams corresponding to the N media sources; or
receiving, by the first media device, a fourth session message sent by the second media device, wherein the fourth session message includes a priority indicator, and the priority indicator is used to determine global priorities of the media streams corresponding to the N media sources; and sending, by the first media device, a fourth session answer message to the second media device, wherein the fourth session answer message includes an adjustment indicator for the priority indicator, and global priorities, adjusted based on the adjustment indicator, of the media streams corresponding to the N media sources are the global priorities, determined by the first media device, of the media streams corresponding to the N media sources.

8. The method according to claim 7, wherein
the third session message, the fourth session message, the third session answer message, or the fourth session answer message further includes a port multiplexing instruction, wherein the port multiplexing instruction is used to instruct to transmit, by using a same port address, media streams that have a same intra-source priority and corresponding to different media sources.

9. The method according to claim 5, wherein when N is equal to 1, the priority indicator comprises a media stream intra-source priority indicator, wherein the media stream intra-source priority indicator is used to indicate intra-source priorities of media streams corresponding to a media source.

10. The method according to claim 5, wherein when N is greater than 1, the priority indicator comprises a media source priority indicator, a media stream intra-source priority indicator, and a priority reference weight indicator, wherein
the media source priority indicator is used to indicate priorities of different media sources, the media stream intra-source priority indicator is used to indicate intra-source priorities of media streams corresponding to a same media source, and the priority reference weight indicator is used to indicate a reference weight of the media source priority indicator and a reference weight of the media stream intra-source priority indicator.

11. The method according to claim 1, wherein
performing, based on the determined global priorities of the media streams corresponding to the N media sources, congestion control on the media streams corresponding to the N media sources that are sent by the first media device to the second media device comprises: discarding some or all of media data packets of media streams, having relatively low global priorities, in the media streams corresponding to the N media sources that are to be sent by the first media device to the second media device; or delaying sending of some or all of media data packets of media streams, having relatively low global priorities, in the media streams corresponding to the N media sources that are to be sent by the first media device to the second media device.

12. A media device, comprising:
a non-transitory computer readable medium having a plurality of computer readable instructions stored thereon; and
a processor coupled to the computer readable medium and configured to:
determine global priorities of media streams corresponding to N media sources, wherein N is a positive integer, the N media sources are N media sources provided by the media device in a media session in which a second media device participates, and one of the N media sources corresponds to at least two media streams simulcast in the media session, wherein the global priorities of the media streams corresponding to the N media sources are determined jointly based on priorities of the N media sources, and intra-source priorities of media streams corresponding to each of the N media sources; and when a transmission path between the media device and the second media device is congested, perform, based on the determined global priorities of the media streams corresponding to the N media sources, congestion control on the media streams corresponding to the N media sources sent by the media device to the second media device.

13. The media device according to claim 12, wherein
the global priorities of the media streams corresponding to the N media sources are further determined jointly based on priority reference weights, wherein the priority reference weights are a reference weight of the priorities of the N media sources and a reference weight of the intra-source priorities of the media streams corresponding to each of the N media sources.

14. The media device according to claim 12, wherein the processor is further configured to determine, by negotiating with the second media device, the global priorities of the media streams corresponding to the N media sources.

15. The media device according to claim 12, wherein the processor is further configured to: determine, according to a user priority setting instruction, the global priorities of the media streams corresponding to the N media sources; or determine, according to a preconfigured priority determining policy, the global priorities of the media streams corresponding to the N media sources.

16. The media device according to claim 12, wherein the processor is further configured to: when the transmission path between the media device and the second media device is congested, discard some or all of media data packets of media streams, having relatively low global priorities, in the media streams corresponding to the N media sources that are to be sent by the media device to the second media device; or when the transmission path between the media device and the second media device is congested, delay sending of some or all of media data packets of media streams, having relatively low global priorities, in the media streams corresponding to the N media sources that are to be sent by the media device to the second media device.

17. The media device according to claim 12, wherein when the media device is a conferencing server, the second media device is a media terminal; or when the media device is a media terminal, the second media device is a media terminal or conferencing server.

18. A communications system, comprising:
a first media device and second media device, wherein the first media device is the media device according to claim 12.

* * * * *